US007925704B2

(12) United States Patent
Keller et al.

(10) Patent No.: US 7,925,704 B2
(45) Date of Patent: Apr. 12, 2011

(54) METHOD AND SYSTEM FOR A RELIABLE DISTRIBUTED CATEGORY-SPECIFIC DO-NOT-CONTACT LIST

(75) Inventors: Arthur M. Keller, Palo Alto, CA (US); Lee Holloway, Cupertino, CA (US); John Rodrigues, San Lorenzo, CA (US); Dat Huu Nguyen, Santa Ana, CA (US); Thomas Belote, Palo Alto, CA (US); Matthew B. Prince, Chicago, IL (US)

(73) Assignee: UNSPAM, LLC, Chicago, IL (US)

( * ) Notice: Subject to any disclaimer, the term of this patent is extended or adjusted under 35 U.S.C. 154(b) by 1324 days.

(21) Appl. No.: 10/835,696

(22) Filed: Apr. 29, 2004

(65) Prior Publication Data

US 2005/0246344 A1    Nov. 3, 2005

(51) Int. Cl.
*G06F 15/16* (2006.01)
(52) U.S. Cl. ........ 709/206; 709/204; 709/232; 713/168; 713/182; 707/10; 379/142.05; 379/188; 379/196; 726/1; 726/22; 705/50
(58) Field of Classification Search .................. 713/176, 713/182, 168; 707/10; 709/206, 204, 232; 726/1, 2, 22; 379/142.05, 188, 196; 705/50
See application file for complete search history.

(56) References Cited

U.S. PATENT DOCUMENTS

| | | | |
|---|---|---|---|
| 6,130,937 A | | 10/2000 | Fotta |
| 6,330,317 B1 * | | 12/2001 | Garfinkel ............ 379/196 |
| 6,868,498 B1 * | | 3/2005 | Katsikas ................ 726/14 |
| 7,099,444 B1 * | | 8/2006 | Russell .............. 379/142.02 |
| 7,158,630 B2 * | | 1/2007 | Fotta et al. ........... 379/266.08 |
| 7,206,814 B2 * | | 4/2007 | Kirsch ................... 709/206 |
| 7,461,263 B2 * | | 12/2008 | Prince ................... 713/182 |
| 2002/0052921 A1 | | 5/2002 | Morkel |
| 2004/0148506 A1 * | | 7/2004 | Prince ................... 713/176 |

(Continued)

FOREIGN PATENT DOCUMENTS

WO    WO 01/18631 A1    3/2001

OTHER PUBLICATIONS

"FTC Launches Do Not Call Registry", News Report, p. 1, www.govtech.com, Jul. 2003.*

(Continued)

*Primary Examiner* — Nasser Moazzami
*Assistant Examiner* — Shanto M Abedin
(74) *Attorney, Agent, or Firm* — Blakely, Sokoloff, Taylor & Zafman LLP

(57) ABSTRACT

A computer implemented method comprising receiving a list of one or more contact points from a sender and comparing the list of one or more contact points to a satellite server's do-not-contact list. Any contact point on the list of one or more contact points that appears on the satellite server's do-not-contact list is reported to the sender. The satellite server's do-not-contact list is generated from a do-not-contact list distributed by a master server. A registrant registers with the master server to provide a registrant contact point to be on the do-not-contact list to be distributed by the master server. The contact points in the registry may be organized in a hierarchy with preferences at one or more levels.

118 Claims, 13 Drawing Sheets

U.S. PATENT DOCUMENTS

2004/0181462 A1* 9/2004 Bauer et al. .................. 705/26
2005/0210272 A1* 9/2005 Fotta ............................ 713/188

OTHER PUBLICATIONS

"The FTC and Spam", Eric Allman, pp. 62-69, www.acmqueue.com, Sep. 2003.*

Keller, A., "An Independent, Reliable, Distributed, and Secure Spam Opt-Uut Registry," pp. 1-6, University of California at Santa Cruz, Baskin School of Engineering.*

"FTC Business Alert", Federal Trade Commission, p. 1, Apr. 2002.*

Hallam-Baker, Phillip, [CPE] RE: Congress finally poised to vote on anti-spam bill [sp], IEFT ARGF Mailing List Online, XP 002286062, pp. 1-2, Nov. 21, 2003.*

Livingston, Ben, "Possible modifications to Washington, "anti-spam" law," Internet Newsgroup, pp. 1-2, Jan. 31, 2002.*

Francoise Becker, EU workshop on unsolicited commercial communications or spam—Brussels, pp. 1-9, Oct. 2003.*

Eddie Rabinovitch, "Securing Your Internet Connection: A Sequel", IEEE Communications Magazine, pp. 1-3, Sep. 2002.*

Hallam-Baker, Phillip, [CPE] RE: [Asrg] Re: [Politech] Congress finally poised to vote on anti-spam bill [sp], IEFT ARGF Mailing List Online, Nov. 21, 2003, 2 pages.

Livingston, Ben, "Possible modifications to Washington, "anti-spam" law," Internet Newsgroup, Jan. 31, 2002, 2 pages.

Sachs, David, "Charles Hudson's Weblog" Internet Citation Online, Jun. 6, 2003, 2 pages.

* cited by examiner

| Electronic Contact Point | Type |
|---|---|
| 100.3 | EMAIL 200.3 ▼ |

Telephone Number

300.3

☒ Category A

Address

310.3

☐ Category B

☐ Category C

| City | State | Zip Code |
|---|---|---|
| 320.3 | 330.3 | 340.3 |

☐ Category D 400.3

Country

USA 350.3 ▼

Figure 3

Category Table

| Category ID | Category Name |
|---|---|
| 1 | Category A |
| 2 | Category B |
| 3 | Category C |

401.3A

Contact Point Table

| Contact Point ID | Type | Identifier |
|---|---|---|
| 1 | Email | KYTBCNDS |
| 2 | Email | UYT65FHD |
| 3 | Telephone | IUHJHHGD |

402.3A

Category Preferences Table

| Contact Point ID | Category ID | Want/Don't Want |
|---|---|---|
| 1 | 1 | Don't Want |
| 1 | 2 | Want |
| 2 | 1 | Want |
| 3 | 2 | Don't Want |
| 3 | 3 | Don't Want |

METHOD AND SYSTEM FOR A RELIABLE DISTRIBUTED CATEGORY-SPECIFIC DO-NOT-CONTACT LIST

BACKGROUND

1. Field

The invention relates to the field of communications. More specifically, the invention relates to security of communication information.

2. Prior Art

According to the Direct Marketing Association (DMA), in 2001 telemarketing accounted for $660 billion in sales. Consumer advocates estimate that more than 24 million calls are made daily by telemarketers (some households receive as many as 21 calls a week). In spite of their popularity with businesses, the telephone calls, which often interrupt people in their homes at inopportune times, are near the top of many consumers' lists of complaints. In addition to unwanted telephone calls, unsolicited commercial email (also known as "spam") is reported to account for more than half of all email traffic, thus inundating consumers' inboxes. Recently, marketers have begun targeting instant messaging systems with unsolicited messages (known as "spim") and mobile devices (such as mobile phones that accept Simple Text Messages (also known as "SMS") messages, pagers, and personal digital assistant devices). It is clear consumers want a way to say "no" to these unwanted messages.

In January of 2004 the United States enacted 15 U.S.C. §§7701-16, known as the CAN-SPAM Act. The new law instructs the Federal Trade Commission (FTC) to study the implementation of a national no-spam registry. Such a registry is modeled generally after the FTC's very popular do-not-call list, which was created six months prior to the passage of CAN-SPAM. In addition to the Federal do-not-call list, state-level do-not-call lists have been passed by forty-two states: Alabama, Alaska, Arizona, Arkansas, California, Colorado, Connecticut, Florida, Georgia, Hawaii, Idaho, Illinois, Indiana, Kansas, Kentucky, Louisiana, Maine, Massachusetts, Michigan, Minnesota, Mississippi, Missouri, Montana, Nebraska, Nevada, New Hampshire, New Jersey, New Mexico, New York, North Carolina, North Dakota, Oklahoma, Oregon, Pennsylvania, South Dakota, Tennessee, Texas, Utah, Vermont, Virginia, Wisconsin, and Wyoming.

Do-not-call laws have been successful in stopping unwanted telemarketing calls according to reports from multiple states as well as initial analysis by the FTC. In addition, fines from these laws have generated substantial revenue for several states. Through the end of 2003, states had collected nearly $5 million in fines from violations of their do-not-call lists. Governments also generate revenue from assessing fees for marketers to access the do-not-call lists. For example, the FTC charges each marketer $29 per area code per year to a maximum of $7,375 for access to the Federal do-not-call list. Individual states have set their own fees to access their state-based lists. Once purchased by a marketer, the do-not-call lists are distributed as plain text files. Marketers face an additional burden of having to design a process to scrub their internal calling lists of the do-not-call list entries.

To provide this service for companies, technologies have been designed to ensure automatically do-not-call compliance. For example, U.S. Pat. No. 6,330,317, to Garfinkel, entitled "Call Blocking System," describes a system that automatically blocks outgoing calls to consumers who appear on either a company's internal or legally-mandated external do-not-call lists. The system interacts with the company's telephone system and automatically stops calls to phone numbers in a do-not-call database before they are dialed.

In addition, U.S. Pat. No. 6,130,937, to Fotta, entitled "System and Process for Automatic Storage, Enforcement and Override of Consumer Do-Not-Call Requests," describes a system and process for a company to manage do-not-call lists. The system described allows companies to store efficiently, update, and, when appropriate, override a do-not-call list. Under the described system, a do-not-call list contains the telephone numbers of individuals who have expressed a desire not to be contacted. The system integrates both the company's internal do-not-call list as well as any external lists, such as those mandated by the state and federal laws described above.

Unfortunately, the use of these patented technologies has illuminated a number of problems that arise when attempting to extend the idea of a do-not-call list to other do-not-contact systems such as email. In the case of the no-spam registry proposed under the CAN-SPAM Act, several technological critiques have been raised. First, unlike telephone numbers, email addresses are valuable in part due to their secrecy. Because the sender of an email message incurs minimal marginal costs with each email sent, if an exposed email address risks receiving a virtually unlimited amount of unsolicited email. If a no-spam registry is created, the list of email addresses cannot be distributed in plaintext in the way telephone numbers have been in the do-not-call context without risking expropriation and abuse by rogue marketers.

Second, marketers are subject to a "single point failure" if a central do-not-contact list system is disrupted. This specific concern was raised by the Direct Marketing Association and the Email Service Provider Coalition in their response to the FTC's request for public comments on a no-spam registry. Since, by law, marketers would have to rely on the system, if the single point were disrupted then marketers would have no mechanism for complying with the law. This is not a rhetorical concern as rogue spammers are suspected of intentionally having disrupted several other centralized anti-spam databases. For example, the MAPS and SPEWS Real Time Blocklist anti-spam services, while not no-spam registries, have been regularly subjected to so-called "Denial of Service" attacks. These attacks became so disruptive that SPEWS was permanently taken offline in August of 2003. Implemented using current do-not-contact technologies, a no-spam registry would be a likely target of similar attacks.

Third, a centralized implementation of a do-not-contact system creates legal problems for some marketers. If a marketer is required to turn over personally identifiable contact points of individuals on their contact list(s), there may be a chilling effect on individuals signing up for particular services. For example, if individuals know that a sender of taboo products is required to turn over their contact point identities to a central authority, they may be reluctant to purchase from or register with the vendor. Courts have found this is a violation of the First Amendment of the U.S. Constitution because the central authority's access to individuals' preferences effectively chills free speech. As a result, for contact points that include personally identifiable information (e.g., email addresses, instant message IDs, etc. . . . ), it is constitutionally mandated that there be a way to check against a no-contact registry without revealing the identities of the individuals on a sender's list. Current technology does not provide a mechanism to satisfy this requirement.

Finally, the do-not-call list has proven to be extremely "coarse." There are only two possibilities for a registrant: a phone number is either on a particular list or it is not. If someone wants to continue to receive unsolicited telephone calls about a certain class of products (e.g., charities), but not another (e.g., phone service), they have no way to express that preference. As a result, the do-not-call law has been criticized by some for being under-restrictive, and by others as being over-restrictive. For message delivery systems like email, both marketers and registrants have expressed concern that these limited choices will not adequately account for individual user preferences.

While the example above specifically relates to email, the same problems will continue to arise as individuals and governments seek to control other electronic communications technologies. In any technology where the marginal cost of sending a message is virtually zero, existing do-not-contact solutions will not suffice. These additional communications technologies currently include: instant messaging, text messaging, paging, Voice Over Internet Protocol (VoIP), etc. Several others are likely to be developed over time. In addition, as the cost of making a telephone call decreases, similar problems are likely to appear in the telephone context.

Due to these criticisms, several commentators have suggested that it is not technically possible to implement a secure, reliable no-spam registry. This sentiment was echoed at Congressional hearings on the CAN-SPAM Act as well as by Timothy Muris, the chairman of the Federal Trade Commission (FTC).

SUMMARY

A method and apparatus for a reliable, distributed, hierarchical, category-specific do-not-contact list system is described. According to one aspect of the invention, individuals may register their contact points on the do-not-contact list system. In registering their contact points, they may elect specific types of communications they do not want to receive. The registration information is then distributed among the multiple nodes of the do-not-contact list system. Individuals wishing to send communications to a registered contact point can then check with any node of the do-not-contact list system in order to determine whether their communication is forbidden or allowed. The distributed implementation ensures easy access to the information for individuals wishing to send communications, and prevents any attack on a single node from disrupting the do-not-contact list system.

One aspect of the invention pertains to a computer-implemented method. The method comprises receiving a list of one or more contact points from a sender and comparing the list of one or more contact points to a satellite server's do-not-contact list. Any contact point on the list of one or more contact points that appears on the satellite server's do-not-contact list is reported to the sender. The satellite server's do-not-contact list is generated from a do-not-contact list distributed by a master server. A registrant registers with the master server to provide a registrant contact point to be on the do-not-contact list that is distributed by the master server.

Another aspect of the invention pertains to another computer implemented method. The computer implemented method comprises receiving a list of one or more contact points from a sender and comparing the list of one or more contact points to a satellite server's do-not-contact list. Any contact point on the list of one or more contact points that appear on the satellite server's do-not-contact list is reported to the sender. The satellite server's do-not-contact list is generated through one or more periodic updates with one or more other satellite servers. A registrant registers with any of the satellite servers to provide a registrant contact point that may not be contacted.

Another aspect of the invention pertains to a method of registering a registrant's contact point to be on the do-not-contact list. The method of comprises receiving a registrant's registration information in which the registration information including a contact point. The method further comprises storing the registrant's registration information in a temporary storage and confirming the contact point for the registrant. The method also comprises determining whether the contact point has been registered in the do-not-contact list. The registrant contact point is registered to obtain an encrypted registrant contact point. The method also comprises adding the encrypted contact point to the do-not-contact list if the contact point has not been registered in the do-not-contact list. And, the method also comprises deleting the registrant's registration information from the temporary storage.

Another aspect of the invention pertains to a computer implemented method. The computer implemented method comprises uploading a sender's list of contact points and encrypting the contact points to obtain encrypted contact points. The method further comprises transmitting encrypted contact points to a satellite server comparing the encrypted contact points to the satellite server's do-not-contact list. The method further comprises returning any matched contact points between the encrypted contact points and the satellite server's do-not-contact list and removing matched contact points from the sender's list of contact points.

Another aspect of the invention pertains to a method that receives a list of one or more contact points from a sender, encrypts each of the one or more contact points, and determines a hierarchical level and a categorical rule for each of the one or more contact points on the list. The results are returned to the sender for each hierarchical level and categorical rule for each of the one or more contact points on the list. The results further include appropriate categorical rule for each hierarchical level of each of the one or more contact points on the list.

These and other aspects of the present invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings:

FIG. 3 is an exemplary block diagram of an input collection form according to one embodiment of the invention;

FIG. 3A is an exemplary block diagram of a relational database scheme to store category information according to one embodiment of the invention;

DETAILED DESCRIPTION

Figure 1:
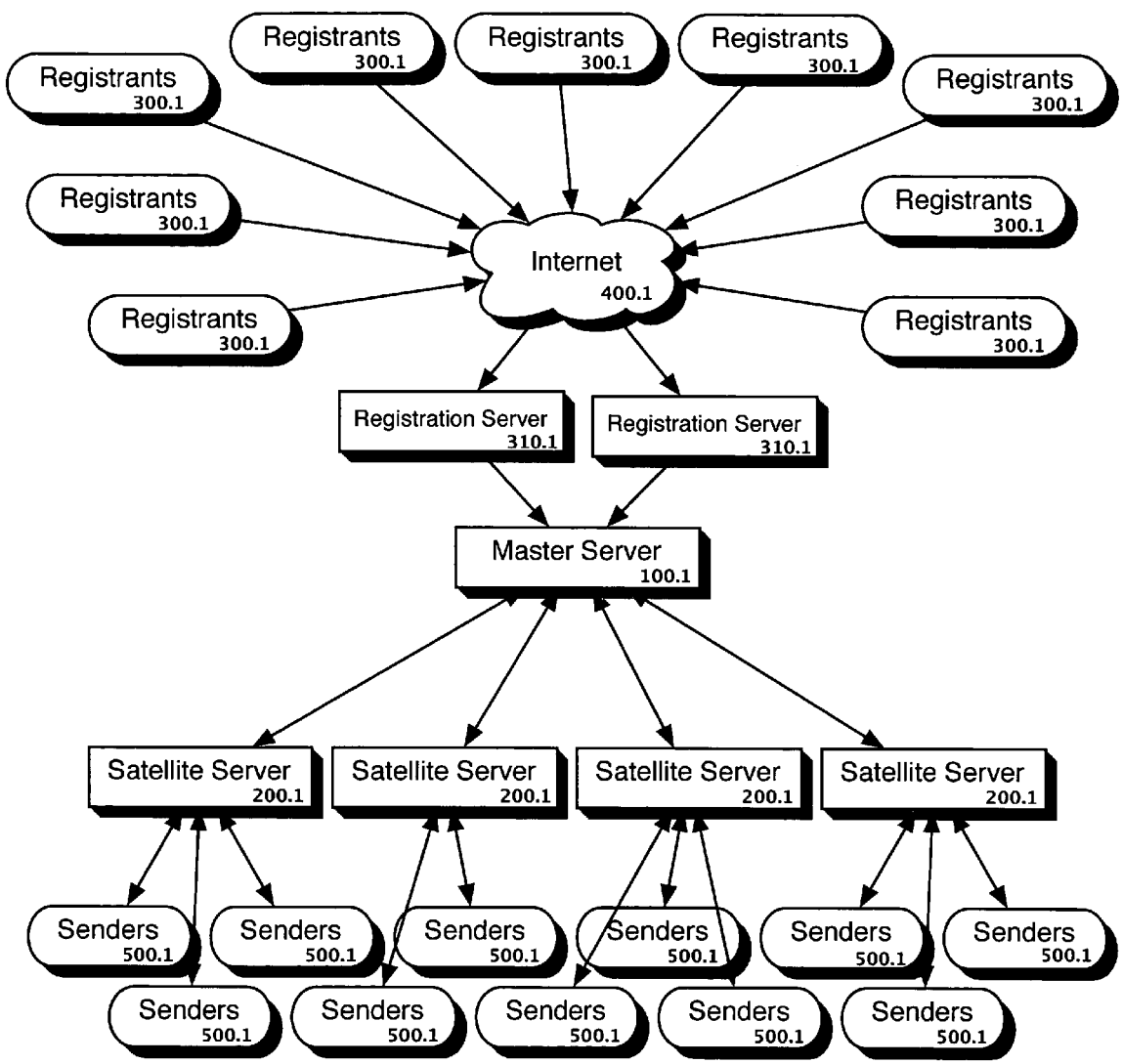
FIG. 1 is an exemplary block diagram of a do-not-contact list system with a centralized master server and a variable number of satellite servers according to one embodiment of the invention.

In the following description, numerous specific details and implementations are set forth to provide a thorough understanding of the invention. However, it is understood that the invention may be practiced without the specific details of some of the implementations and embodiments. In other instances, well-known and understood circuit, structures, processes, and techniques have not been described in detail so as not to obscure the invention.

Overview

A method and apparatus for creating, implementing, and administering a distributed, category-specific do-not-contact list system is described. A do-not-contact list system implemented in this way allows registrants to express their preference not to receive certain kinds of messages at their contact points. The categories that can be registered with the system are variable, can be adapted over time to reflect registrants' preferences, and may include any particular characterization of messages, e.g., those advertising pornography, gambling, prescription drugs, alcohol, tobacco, financial services, etc . . . The contact points that can be registered include any electronic contact point whose address can be represented in an alphanumeric form or other symbols in any language, e.g., electronic mail, instant messenger, telephone, facsimile, mobile phone, domain name, pager, etc . . .

In the foregoing, the description of some embodiments of the invention refers to "registrants" and "senders." It should be understood that a "registrant" includes any owner, user, or third party with control of a contact point or group of contact points that can be registered on a do-not-contact registry (or list). For example, in the context of email, a registrant could be a user, an Internet Service Provider (ISP) or Email Service Provider (ESP), a business in control of one or more email addresses, a parent registering a child's address, etc . . . A registrant could also be an Internet Service Provider (ISP) or business in control of one or more domains (e.g., registering the entire domain example.com and effectively covering both johndoe@example.com and janesmith@example.com). While the above example uses email addresses, registrants may also register other electronic contact points on the do-not-contact list or registry (e.g., instant message IDs, telephone numbers, mobile phone numbers, pager numbers, etc . . . ). It should also be understood that a "sender" may mean in the context of the embodiments of the present invention any individual, business, or device capable of initiating the transmission of, facilitating the transmission of, or actually transmitting, a message to a contact point of a type that may be registered by a registrant on a do-not-contact list or registry. The form of the message and the mechanism of its initiation, facilitation, or transmission may vary from one type of contact point to another. Finally, it should be understood that a "sender's list," as it is referred to in the description, means a list maintained by a sender and comprised of one or more contact points of a type that may be registered by a registrant on a do-not-contact list/registry.

Upon registration of a contact point, a registrant can select the categories of messages they do not want to receive. For example, a registrant can register the email address johndoe@example.com. During the registration the registrant can elect not to receive any pornographic electronic mail messages. After registered, when a sender of pornographic material goes to send a new message they can check the list of intended recipients against the do-not-contact list system. If johndoe@example.com is on the sender's list then the sender can be alerted that the recipient does not want to receive pornographic messages. Because the sender is placed on notice in this way, laws can be written in order to attach liability to senders who continue to send material against the expressed wishes of recipients on the do-not-contact list. According to another embodiment of the invention, registrants may designate categories they want to receive, or categories they do not care if they receive. The method in which the categories and individual contact points are stored on the registry are described in detail herein.

According to one embodiment of the invention, the do-not-contact list system described herein is distributed to multiple satellite servers. These satellite servers can be distributed geographically or across multiple connections to a network. This approach allows the do-not-contact list system process queries from registrants and senders in a more efficient and robust manner than if the list were housed on a central server. Additionally, this distributed implementation means it is difficult for an attacker to disable a single node and shut down the system, e.g., with a denial of service (DoS) attack, etc . . .

FIG. 1 is an exemplary block diagram of a distributed, category-specific do-not-contact list system according to one embodiment of the invention. The distributed, category-specific do-not-contact list system illustrated in FIG. 1 includes a central master server (100.1) and a variable number of satellite servers (200.1). Under this embodiment of the invention, registrants (300.1) access one of a variable number of registration servers (310.1) through the Internet (400.1) in order to register their contact points and/or the categories of messages they do not want to receive. The registration server (310.1) relays the registered information to the master server after it has been verified as described herein. In an alternative embodiment of the invention, registrants (300.1) contact the master server (100.1) directly to provide their registrations. Once contact points are registered and verified, the master server (100.1) periodically distributes a copy of the do-not-contact list and categories to the satellite servers (200.1), or alternatively only the changes to the do-not-contact list and categories that have not yet been transmitted to each satellite server (200.1). Under this embodiment of the invention there can be a variable number of satellite servers (200.1).

Still with FIG. 1, once a satellite server (200.1) has received the current version of the do-not-contact list, the satellite server (200.1) can update or create the satellite server's (200.1) do-not-contact list so that it is current or maintain a copy of the do-not-contact list received. The satellite server (200.1) also receives a list of contact points from senders (500.1). The satellite server (200.1) compares the list of contact points from the senders (500.1) to the satellite server's (200.1) do-not-contact list or to its copy of the do-not contact list received from the master server (100.1). The satellite server (200.1) then reports to the senders (500.1) any of their uploaded contact points that appear on the satellite server's (200.1) do-not-contact list. The particular categories of messages those contact points do or do not want to receive may also be reported to the senders (500.1) by the satellite server (200.1). Additionally, the categories of messages that the contact points want to receive may also be reported to the senders (500.1) by the satellite server (200.1)

In an alternative embodiment, the senders (500.1) upload to the satellite server (200.1) one or more categories of the messages to be sent when it uploads the contact points, and the satellite server (200.1) reports only those contact points on the do-not-contact list that do or do not want to receive messages of at least one category uploaded to the satellite server (200.1). A variation of this alternative embodiment restricts the categories reported to the sender to only those categories the sender requests from the satellite server (200.1). Alternatively, another embodiment includes the reports of the categories of messages that the contact points want to receive. In one embodiment, the satellite server (200.1) reports the details, or alternatively the summary, of every transaction to the master server (100.1), which stores a log of all activity.

Under one embodiment of the invention, the master server (100.1) is implemented on a single device, in an alternative implementation of the invention, the master server (100.1) is implemented in a distributed scheme (e.g., implemented on multiple devices on one or more local area network) or using a multi-tiered architecture. Security devices, such as firewalls, hardware encryption cards, and hardware digital keys, are expected to be used in some embodiments of the system described herein. Detailed examples and uses for the embodiment illustrated by FIG. 1 are provided herein.

Figure 2:
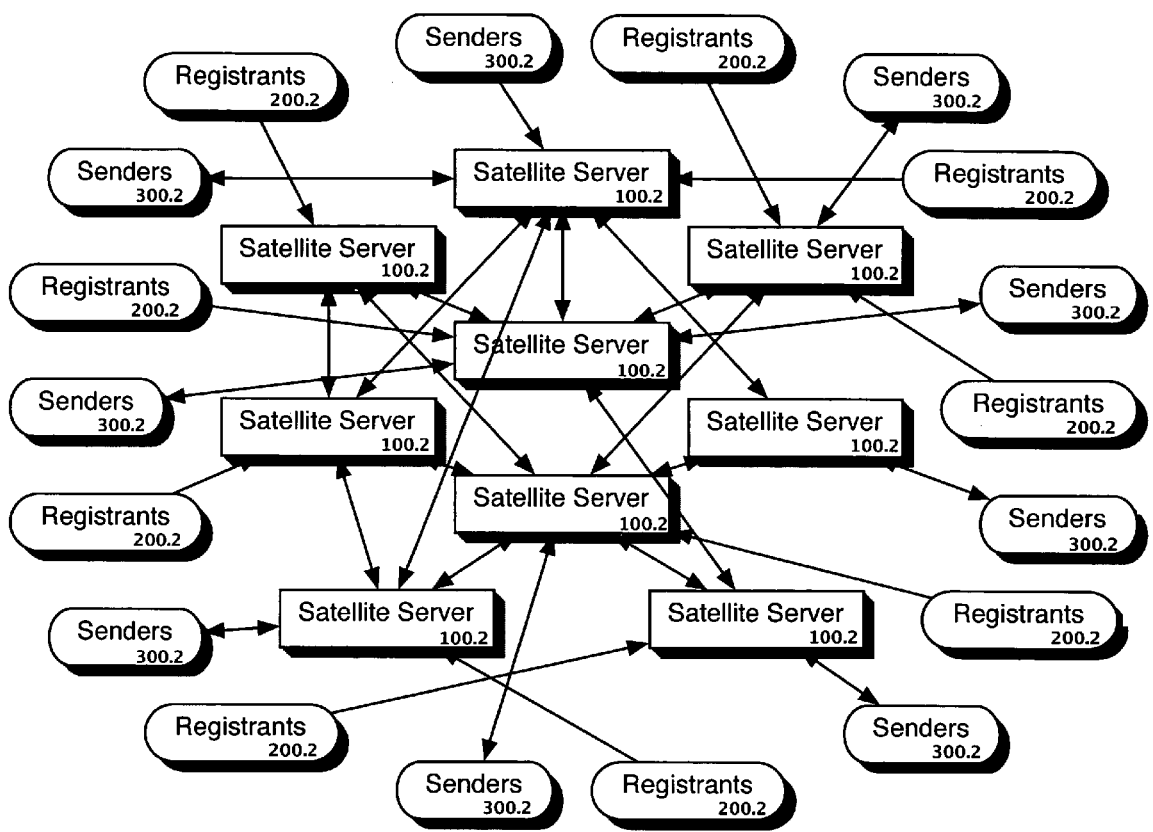
FIG. 2 is an exemplary block diagram of a do-not-contact list system with a variable number of satellite servers, but no centralized master server according to one embodiment of the invention.

FIG. 2 is an exemplary block diagram of a distributed, category-specific do-not-contact list system according to another embodiment of the invention. The distributed, category-specific do-not-contact list system illustrated in FIG. 2 includes a variable number of satellite servers (100.2), but no central master server similar to the central master server (100.1) illustrated in FIG. 1. Under this embodiment of the invention, registrants (200.2) contact a local satellite server (100.2) through the Internet (not shown) in order to register their contact points and category preferences. In an alternative implementation of the invention, registrants may contact an intermediary registration server, which then passes the registration on to a local satellite server (100.2). Periodically, the satellite servers (100.2) contact one another in order to exchange the latest updates. This mechanism allows a complete copy of the registry to be distributed to all the satellite servers (100.2) without the need for a central master server (100.1). Under this embodiment of the invention, senders (300.2) upload their lists of contact points to a local satellite server (100.2). The satellite server (100.2) compares the senders' (300.2) list with the local satellite server's (100.2) own created, updated, or obtained do-not-contact list. The satellite server (100.2) then reports back to the sender (300.2) the contact points on the do-not-contact list and the categories of messages that cannot be sent to them. Alternatively, the satellite server (100.2) can also report back to the sender (300.2) the contact points on the do-not-contact list and the categories of messages that can be sent to them. Detailed examples and uses for the embodiment illustrated in FIG. 2 are provided herein.

Under the embodiments described in both FIG. 1 and FIG. 2, as well as some other embodiments of the invention, when a registrant (e.g., the registrant boxes (300.1) & (200.2)) registers a contact point they must provide certain information to be included in the do-not-contact list. Under one embodiment of the invention, this information may be provided through a website. FIG. 3 is an exemplary diagram illustrating a design for a website including fields for collecting the required pieces of information. Communication between a registrant and the website may be protected by an encryption system such as Netscape's Secure Socket Layer (SSL) protocol or another similar encryption system. The website includes a contact point field (100.3) where registrants provide the alphanumeric representation of the contact point to be registered. Registrants may also be asked for the type of contact point they are registering through the contact point type selector (200.3).

Continuing with FIG. 3, types of contact points that can be selected may include any electronic contact point whose address can be represented with alphanumeric characters or symbols in any language or digital encoding. These contact points include, but are not limited to, email address, instant message identification (ID), mobile phone number, facsimile number, pager number, domain name, subdomain name, etc . . . During registration, demographic data on a registrant may be collected such as a registrant's telephone number (300.3), address (310.3), city (320.3), state (330.3), zip or postal code (340.3), or country (350.3). Other demographic information may also be gathered during registration. Depending on the particular embodiment of the invention, this additional information may include the registrant's name, date of birth, age at time of registration, other data to determine the legal jurisdiction that applies to the registrant, etc . . .

Continuing with FIG. 3, depending on the embodiment of the invention, registrants may be asked to choose one or more categories of messages they do want or do not want to receive through the category selection checkboxes (400.3). Under an alternative implementation of the invention, categories are automatically selected based on the mechanism used by the registrant (e.g., pornography is automatically selected by a registrant registering at a website called www.no-porn-spam.com). These categories can include types of messages (e.g., pornography, alcohol advertisements, tobacco advertisements, gambling advertisements, no messages from a particular sender, etc . . . ), or rules (e.g., no selling my personal information, no unsolicited messages, no messages sent after a certain hour, etc . . . ), or both. Under one embodiment of the invention, one or more categories may apply to each registered contact point. In one embodiment of the invention, each category in the registry can have the values to indicate whether the registrant or group of registrants desire to receive or not receive the particular category of communications (e.g., "want," "do not want," "do not care," etc . . . ). Under one embodiment of the invention, registrants may specify that they "want," "do not want," or "do not care" about future categories that may be added to the do-not-contact list. For example, if a registrant declares that he or she does not want to receive messages in future categories, and at a future date the category of "magazine advertisements" is added, then the registration will automatically be listed as not wanting "magazine advertisements."

Under one embodiment of the invention, the categories may be stored in the do-not-contact list database as a bitset (i.e., 0100010 . . . ). With this implementation the preferences of a contact point can be represented by a series of Boolean state bits. Under this embodiment of the invention, each bit can represent a particular category. The length of the bitset can expand or be reduces as categories are added or removed. Checking against the bitset can be accomplished with a logical bit comparison. In one embodiment if this invention, multi-valued logic is used to represent one or more of the category preferences.

Under an alternative embodiment of the application, a contact point's preferences are maintained in a relational database. FIG. 3A illustrates one particular embodiment of such a relational database. Under such an implementation, categories are stored in a table at a category table (401.3A). Each entry in the category table is assigned a unique category ID as shown in the category table (401.3A). Each contact point is stored in a table at a contact point table (402.3A). Each contact point is assigned a unique contact point ID and a type (e.g., email address, instant message ID, telephone number, mobile phone number, domain, subdomain, etc . . . ) as shown in the contact point table (402.3A). Each contact point is also stored in either their original form (e.g., for the example of an email address: johndoe@example.com) or in a hashed or encrypted form as shown in the contact point table (402.3A). A category preferences table associates the contact points with particular categories at a category preferences table (403.3A). The contact point ID is associated with a particular category ID in the category preferences table (403.3A). Under one embodiment of the invention, each contact point can mark whether they "want," "don't want," or "don't care" about a particular category as shown in the category preferences table (403.3A). For example, in the exemplary block diagram in FIG. 3A, the contact point with the ID of 1 is an email address stored as in a hashed or encrypted form as "KYTBCNDS" in the table (402.3A). In the example embodiment of the database, that contact point is associated with two category IDs: 1 and 2 as shown in the table (402.3A). In the example embodiment of the database, Category ID 1 represents "Category A" as shown in the table (401.3A) and in this particular case the contact point's registrant has indicated he or she does not want (or does not care to receive or not) messages of that particular category type as shown in the table (403.3A). In the example embodiment of the database, Category ID 2 represents "Category B" of the table (401.3A) and in this particular case the contact point's registrant has indicated he or she does want messages of that particular category type of the table (403.3A). The relational database, storage, and query functions can be implemented using any well-known database techniques (e.g., the use of database management systems using Structured Query Language (SQL)).

Under one embodiment of the invention, the website or other registration method may also provide a mechanism to register more than one contact point at a time. Under other embodiments of the invention, registration may be provided over the telephone, via the postal mail, via a registrant client software application, in bulk by Internet Service Providers (ISPs) or other third parties, etc . . . The website may also provide a mechanism to change an existing registration or the categories or preferences that apply to that registration through a mechanism similar to the original registration process. Under one embodiment of the invention, registrations will be valid for a finite period of time (e.g., three years). After that period of time, registrants will need to renew their registrations in order for them to remain on the do-not-contact list. This may be done to limit the size and increase the manageability of the do-not-contact registry.

Figure 4:
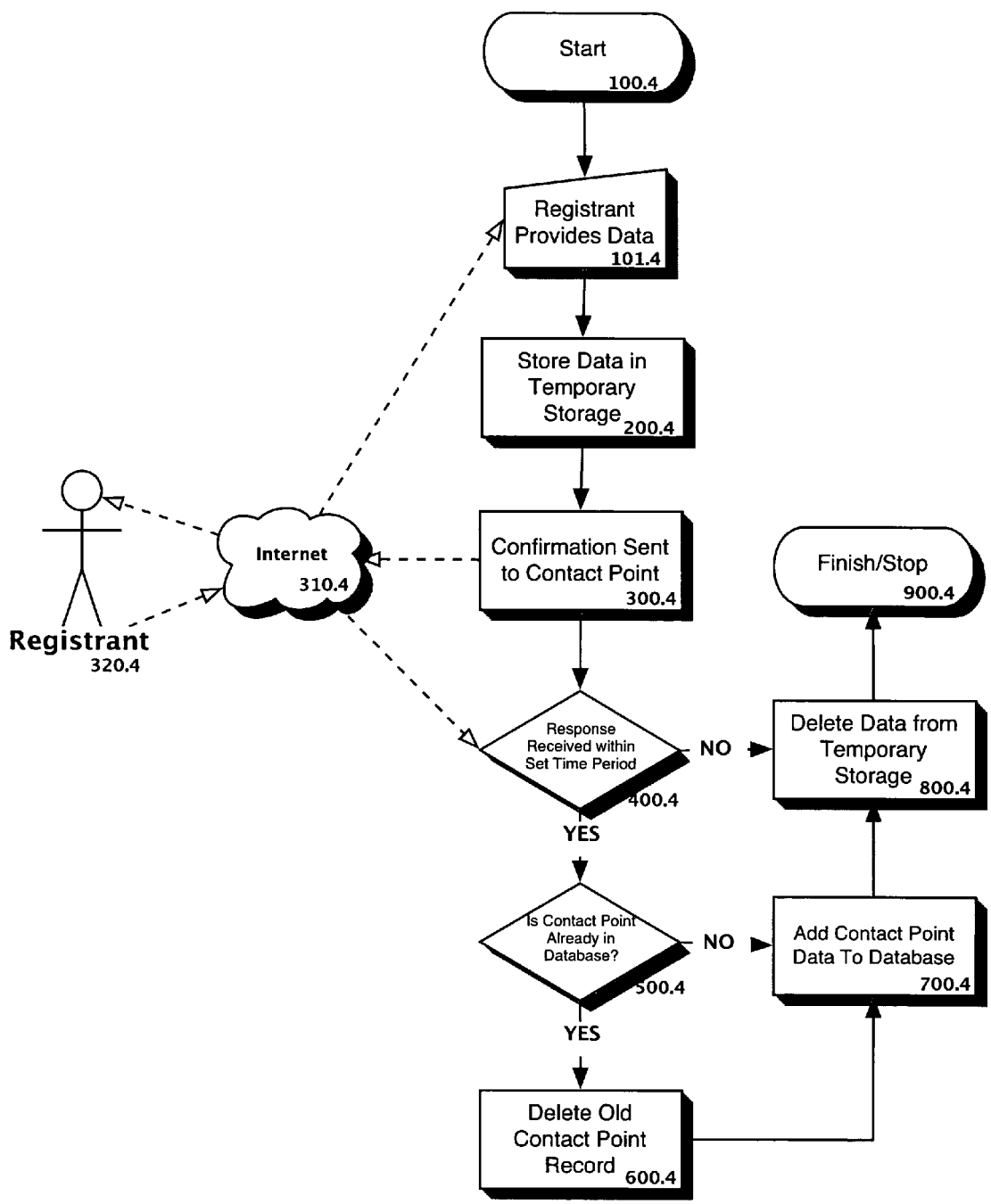
FIG. 4 is an exemplary flow chart of the registration and confirmation process according to one embodiment of the invention.

FIG. 4 is an exemplary flow chart of a process of using a system for registering a contact point on the registry according to one embodiment of the invention. Depending on the embodiment of the invention, the system can have one or more registration servers. These servers may also function as satellite servers, the master server, or may be independent registration servers. In one embodiment, as was described in FIG. 3, to begin, at box (100.4), a registrant (320.4) provides the required registration information to a registration server (101.4) through the Internet (310.4). This information is stored in temporary storage on the registration server as shown at box (200.4). In other embodiments of the invention, this storage could consist of a random access memory, hard disk space, or other suitable storage media for storing the information.

Still with FIG. 4, after storing the registration data in temporary storage, the system sends a confirmation message to the contact point that was provided during registration at box 300.4. This confirmation message passes through the Internet (310.4) and is received by the registrant (320.4) at the contact point, in one embodiment. In one embodiment, the confirmation message includes a link or other suitable manners for the registrant (320.4) to confirm that the registrant (320.4) is in control of the registered contact point. One embodiment includes in the confirmation message a web URL or email reply address together with a request ID identifying the registration request and a random or pseudorandom ID code known only to the recipient of the confirmation message and the registration server.

In one embodiment, the system waits a predetermined period of time for the registrant (320.4) to respond as indicated at box (400.4) (e.g., within 24 hours). If the registrant (320.4) does not respond within the predetermined period of time then the registration data is deleted from temporary storage at box (800.4) and the registration process finishes at box (900.4). If the registrant (320.4) does respond within the predetermined period of time then the system checks to see if the contact point has already been registered as indicated by box (500.4). In an alternative embodiment of the invention, a confirmation message is sent out only when the contact point already exists in the do-not-contact list. Otherwise the contact point is added at box (700.4). If the contact point is already on the database then the system deletes the previous entry at box (600.4) before the contact point then is added to the database at box (700.4). In either case, the entry is time stamped with the time when the entry was verified by the Registrant (320.4) as well as the ID of the registration server. In one embodiment of the invention, the timestamps use some universal time, such as GMT, to identify when entries are created.

In an alternative embodiment of the invention, the former entry is not deleted but simply marked as no longer authoritative. In another alternative embodiment of the invention, the previously current entry is not changed at all, but rather only the entry with the latest timestamp is used. In one embodiment of the invention, the timestamps use some universal time, such as GMT, to identify when entries are created. After the new contact point has been stored in the database at box (700.4), the temporary data is deleted at box (800.4) and the process finishes at box (900.4). In one embodiment, the registration server ID is part of the timestamp.

The database and query functions can be implemented using any well-known database techniques (e.g., the use of database management systems using Structured Query Language (SQL)). The primary key of the registration data may be the combination of hashed contact point and the timestamp. In one embodiment of the invention, the timestamps use some universal time, such as GMT, to identify when entries are created. Typical database systems also support searches on either the hashed contact point or the timestamp or even partial timestamp (registration server ID and range of timestamps). Under one embodiment of the invention, to help prevent the use of the registration process as a way of harassing registrants, a registration server may maintain all requests for a specified period, such as 24 hours, and not allow more than one registration for a contact point unless the previous registration was confirmed. In one embodiment, attempts of registration are distributed to other registration servers, so as to prevent multiple requests to be sent, one to each of several registration servers, and to make it harder for there to be nearly concurrent conflicting updates for the same contact point from different registration servers. Furthermore, requests for confirmation can include the digital signature of the registration server and they can also include tracing information of the request, such as IP address, date and time, and the content of the request.

Contact points may be stored as they were originally entered. In an alternative embodiment of the invention, the contact points may be stored in an encrypted or hashed form. There are several industry well-known hashing and encryption schemes that can be used, including, but are not limited to, SHA-0, SHA-1, SHA-256, SHA-384, SHA-512, MD2, MD4, MD5, RIPEMD-160, RIPEMD-128/256/320, HAS160, HAS-V, HAVAL, Tiger, Panama, Snefru-2, GOST-Hash, BRS-H1/H20, and Whirpool. In one embodiment of this invention, hashing or encryption schemes are used that might not be well known, such as a scheme specifically invented for the implementation of this system. If such an encryption or hashing scheme is used then the contact point is run through the encryption engine or hash prior to being stored. In FIG. 4, this process would take place as the contact point is stored in the database at box (700.4). The original contact point is purged from storage at box (800.4) leaving only the encrypted or hashed version of the contact point. Stored in this way it becomes impossible to determine the original contact point even if the system is compromised unless the encryption or hash is broken. This provides additional security for certain no-contact list systems.

In one embodiment of the invention, contact points may be registered in a hierarchical manner. To illustrate this embodiment, email addresses will be used, but the invention applies to other types of contact points that may be organized hierarchically (e.g., instant messenger IDs organized by service provider, telephone numbers organized by area or country code or exchange, etc . . . ). Registrations may be made for various levels of a hierarchy of contact points. For example, for the email address of user@subsubdomain.subdomain.domain.tld, applicable registrations may possibly be made for the email address itself (e.g., johndoe@stillmore.more.example.com), the entire domain portion of the email address (e.g., stillmore.more.example.com), or a subset of the entire address's domain (e.g., more.example.com, example.com, or .com). While in the above example there are five levels in the hierarchy, the number of possible levels in the hierarchy is not fixed or limited and may vary depending on the type of contact point. In addition, in an alternative implementation, hierarchical registrations of email addresses can include additional levels of the hierarchy for the user (e.g., registrations for user+extension@subsubdomain.subdomain.domain.tld may be validated by using the address user@subsubdomain.subdomain.domain.tld, etc . . . ). In order to verify a registrant is authorized to register a domain or subdomain, registrations for a domain name or a sub (sub . . . )domain name (i.e., any of the above entries that do not contain an at sign ("@")), may be validated using an electronic means, such as a method for validating changes to the registration of the domain name, or sub(sub . . . )domain name, or it may be validated through affidavit by the domain holder.

Figure 5:
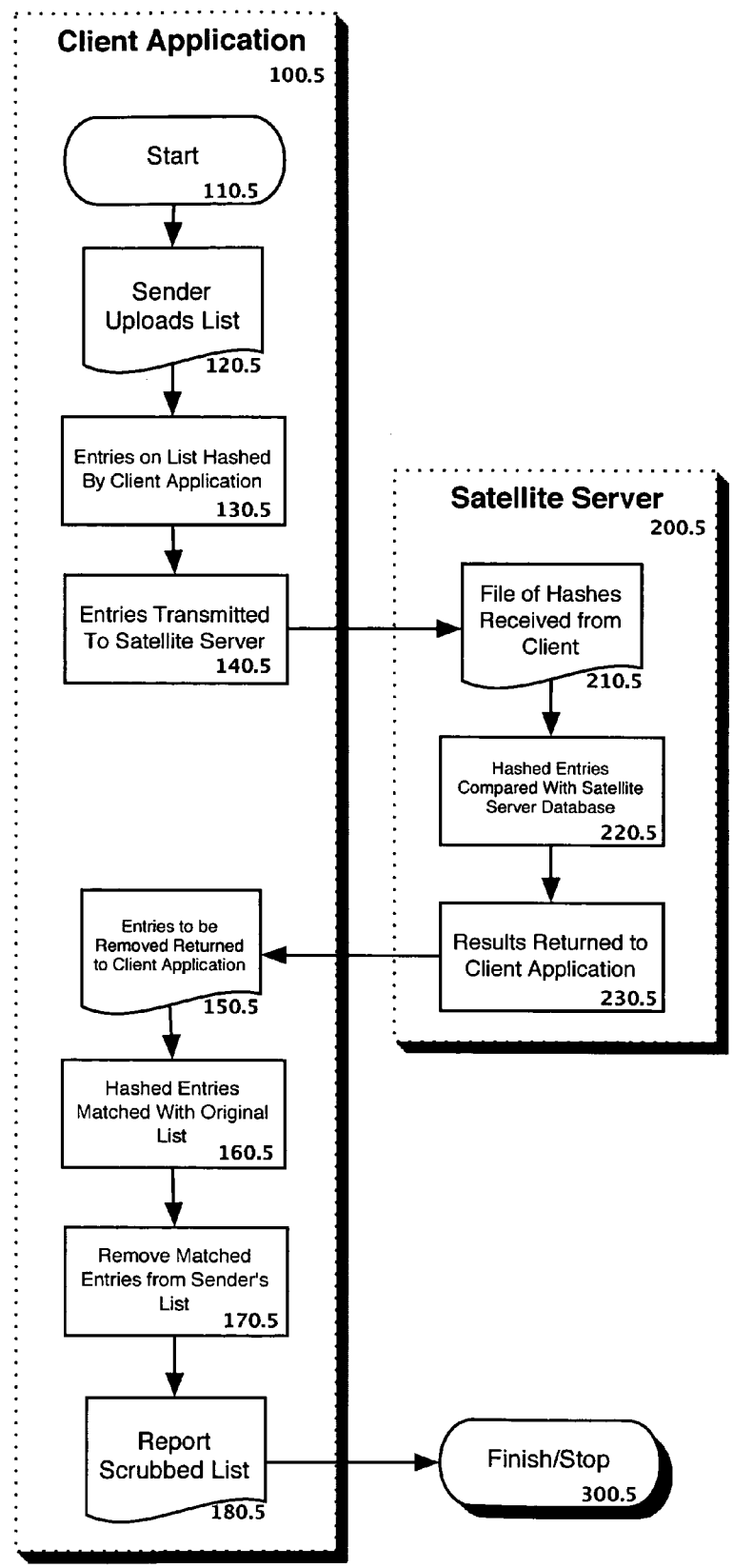
FIG. 5 is an exemplary block diagram of the client/satellite interacting according to one embodiment of the invention.

Under certain embodiments of the invention, once a do-not-contact list is built through registrations as described in FIG. 3 and FIG. 4, the database is stored on satellite servers. When senders need to scrub their internal lists against the no-contact list they contact one or more satellite servers. FIG. 5 describes the interaction between a client application (100.5) and a satellite server (200.5). Under one embodiment of the application, the client application (100.5) resides on the sender's own system. Under an alternative embodiment of the application, the client application (100.5) resides on the satellite server as a web-based application that can be accessed through an Internet browser or on a third server that communicates with the satellite server. In either case, the client application (100.5) interacts with the satellite server (200.5) in order to scrub (e.g., compare, purge, report, etc . . . ) a sender's list against the do-not-contact list.

In one embodiment, the system begins processing a scrub request from a sender at box (110.5). At box (120.5), the client application (100.5) uploads the sender's internal list of contact points. If the embodiment of the invention has stored the contact points in a hashed or encrypted format then the client application (100.5) uses the same hash or encryption scheme in order to encode the sender's contact point at box (130.5). The client application (100.5) then transmits the sender's internal list to the satellite server at (140.5). This transmission between the client application (100.5) and the satellite server (200.5) can be protected by an encryption mechanism such as SSL or other suitable encryption mechanism, particularly when the transmission occurs over the Internet or another network. If the entries have been hashed or encrypted then only the hashed or encrypted data is transferred so the satellite server, and thereby the individual, business or government maintaining the no-contact registry, does not have access to the original contact points from the sender's list.

Continuing with FIG. 5, the satellite server (200.5) receives the sender's internal list of contact points from the client application (100.5) at box (210.5). The contact points on the transmitted list are compared with the satellite server's (200.5) database at box (220.5). The satellite server (200.5) collects any matches and returns them along with any category rules associated with the particular registration at box (230.5).

In one embodiment, the client application (100.5) receives the matched contact points as well as any category rules associated with them at (150.5). If the entries were hashed or encrypted, then the hashed or encrypted entries are matched to the original contact points at box 160.5. Depending on the type of message the sender plans on sending, the matched entries are removed from the sender's list at box (170.5). For example, if a sender is planning on sending a message containing pornography, and a contact point is listed as having opt-ed out of pornographic messages, then the contact point is removed from the sender's list. Finally, the client application (100.5) returns a scrubbed version of the sender's list at box (180.5). The process then completes for both the client application and satellite server at box (300.5).

Figure 6:
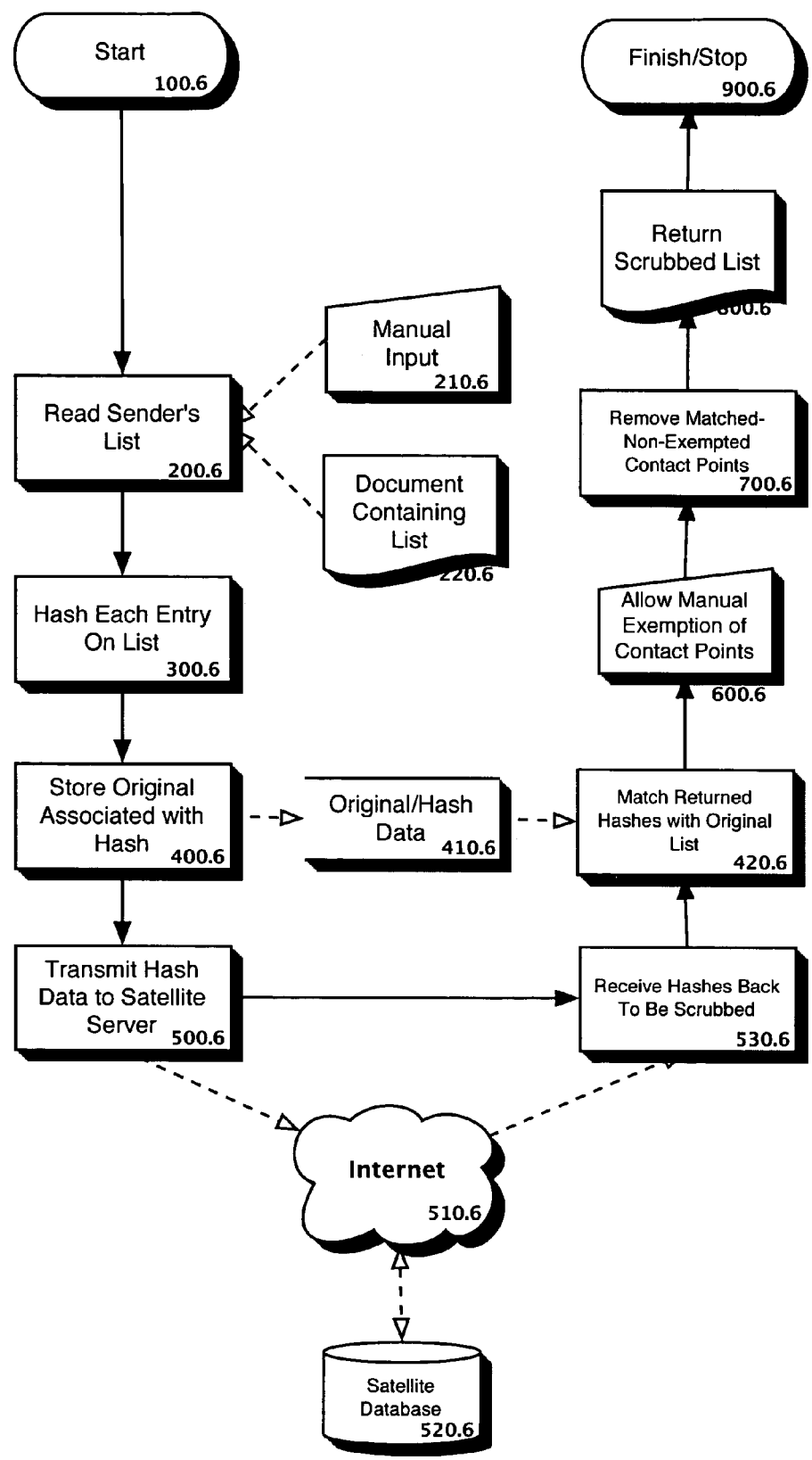
FIG. 6 is an exemplary flow chart of a client application processing a sender's list according to one embodiment of the invention.

FIG. 6 is an exemplary flow chart of the process performed on the client application (100.5) described in FIG. 5 follows according to one embodiment of the invention. As previously discussed, in one embodiment, the client application receives a contact point list from at least one sender and proceeds to process the contact point list. The client application starts at box (100.6) and receives/reads a list of a sender's contact points at box (200.6). These contact points can either be entered manually as shown at box (210.6) or uploaded from an existing file as shown at box (220.6). Assuming the particular embodiment of the invention uses a hash, the client application reads each contact point on the sender's list and hashes each contact point at box (300.6). These hashed contact points are then stored at box (400.6) in temporary storage (410.6). In one embodiment, the hashed contact points are stored associated with their original, unhashed contact points. In another embodiment, the hashed contact points are regenerated by again hashing the original, unhashed contact points at box (420.6), and the original, unhashed contact points instead are stored at box (400.6) in temporary storage (410.6).

Continuing with FIG. 6, the client application then transmits a file containing the hashed contact points, but not the original unhashed contact points, to the satellite server at box (500.6). In one embodiment, the client application is running on the client's own system, and in this embodiment, the transmission of the hashed contact points to the satellite server takes place over the Internet (510.6) and to the satellite server (520.6). In one embodiment, the communications between the client application and the satellite server is protected by an encryption mechanism such as SSL or suitable form of encryption mechanisms.

Still with FIG. 6, in another embodiment, the client application is on a separate computer from both the client's own system and the satellite server, and communication is via Internet, Intranet(s), and/or other network(s). In yet another alternative embodiment, the client application is stored on the same server as the satellite server so the transmission of the hashed contact points from the client application to the satellite server needs not take place over the Internet. The client application could also transmit the sender's list across an Intranet or other network.

Still with FIG. 6, after the satellite server has processed the sender's list, a list of hashed contact points that appear on the do-not-contact list, as well as the specific category opt-outs for each contact point, are returned to the client application at box (530.6). In one embodiment of this invention, information on all the categories for each matching contact point is returned to the client application. In another embodiment of this invention, only the information on those categories specified by the client application that apply to each matching contact point is returned to the client application. In another embodiment of this invention, information on specific categories or demographic information, such as whether the contact point is for a minor, is returned to the client application only if the sender using the client application is approved for receiving such information. In another embodiment of this invention, selected demographic information is returned along with the matching contact points to the client application. In another embodiment of this invention, the categories returned to the client application for each matching contact point is a Boolean combination of the categories of the contact point, the categories submitted by the client application on behalf of the sender, and one or more category filters, such as a "do show this category" filter or a "do not show this category" filter, where said category filters can apply to a specific sender, to all senders using a collective registry, or to a collection of senders identified as interrelated. In another embodiment of this invention, specific (e.g., current age) or summarized demographic information (e.g., a minor) for a contact point is returned to the client application, if available, using an extension of the Boolean combination scheme where one or more resulting Boolean values (e.g., a bit in a bit vector) indicates whether some particular type of demographic information or summary information (e.g., one bit for detail and another bit for summary only) on a contact point is to be returned to the client application. In another embodiment of this invention, multi-valued logic is used instead of a Boolean combination. The client application matches the returned hashed contact points with the original sender's list at box (420.6). Under one embodiment of the invention, the client application then allows the senders to manually exempt individual contact points from being removed from their lists at box (600.6). For example, if a contact point is listed on the do-not-contact registry as only accepting messages from senders with which there is a preexisting business relationship then senders can remove from exclusion those contact points with which the sender does have such a preexisting relationship. After any exemptions have been processed, the client application removes all matched and non-exempted entries from the sender's list at box (700.6). In an alternative embodiment, the client application does not output a cleaned list but instead simply displays a list of names and the categories that apply to them. The client application then outputs or returns to the sender a version of the sender's list with the matched and non-exempted contact points removed at box (800.6). The sender can then use this list to send out messages without risk of running afoul of the do-not-contact list's rules.

Figure 6A:
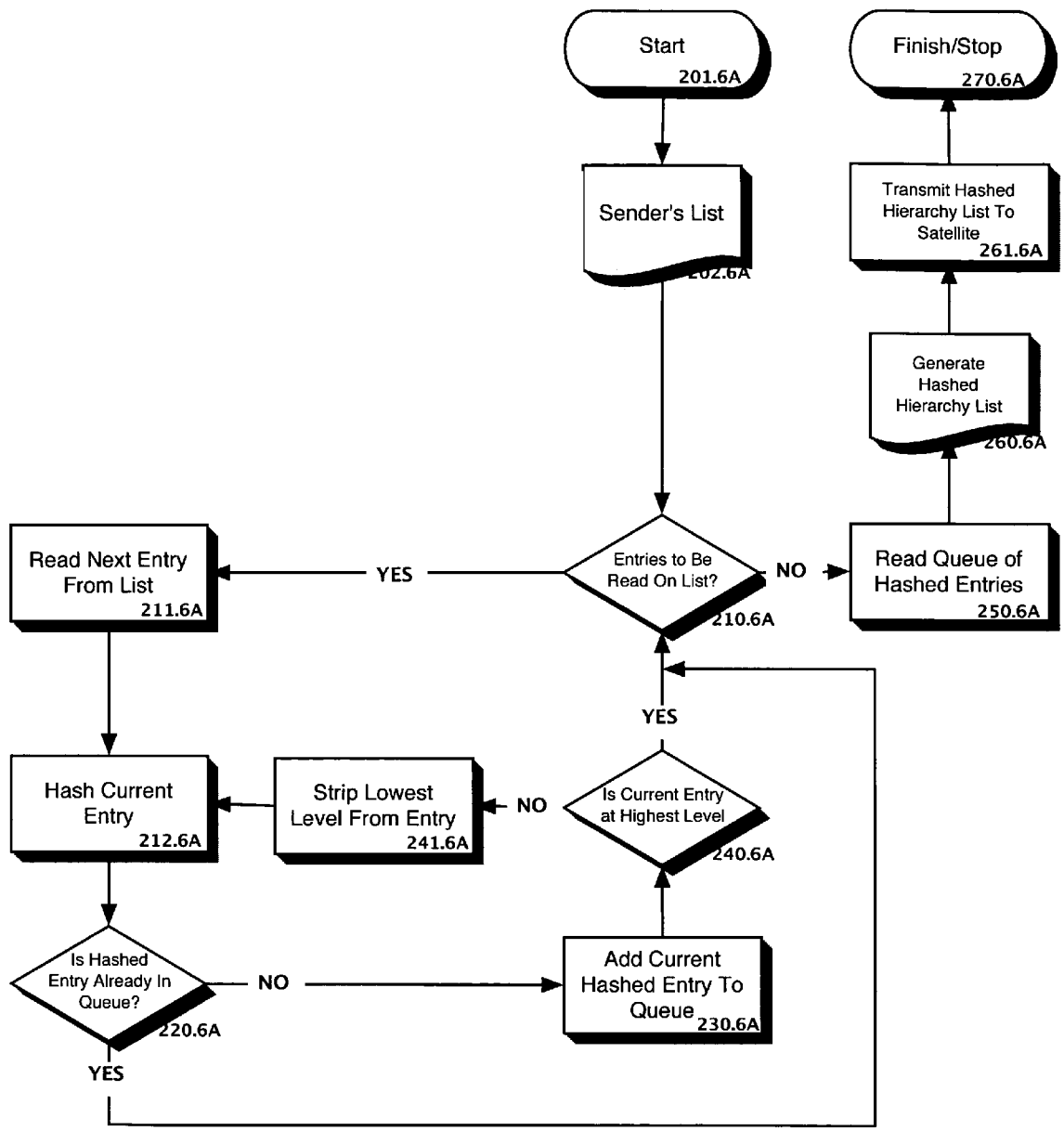
FIG. 6A is an exemplary flow chart of a client application reading a sender's list for a do-not-contact registry which contains hierarchical registrations according to one embodiment of the invention.

In one particular embodiment where the do-not-contact list/registry contains hierarchical registrations, the process of checking a sender's list using a client application against the do-not-contact list or registry involves some additional steps. FIG. 6A is an exemplary flow chart illustrating one embodiment of the additional processes of the client application when checking a do-not-contact list/registry that includes hierarchical registrations. According to one embodiment of the invention, the client application begins a new check at box (201.6A). The sender's list is read or otherwise inputted into the client application (202.6A). The client application starts at the top of the sender's list and checks to see if there are entries on the list to be processed (210.6A). If there are entries that have not yet been processed, the client application reads the next entry from the list at box (211.6A). For example, using the case of email, an entry on the sender's list may be johndoe@mail.example.com. The entire entry is hashed at box (212.6A) to generate a hashed entry. The client application checks the hashed entry queue to determine if the hashed entry is already in the hashed entry queue (220.6A). If the entry is not already in the queue then it is added to the queue at box (230.6A). Additional information about the hashed entry can also be stored in the hashed queue including, for example, the level of the hierarchy the particular entry belongs to and an association back to the original unhashed entry for reference when the client application receives a response from the satellite server. After the hashed entry has been added to the queue, the flow of the client application moves to box (240.6A). If the hashed entry already is in the hashed entry queue at box (220.6A) then the flow returns to box (210.6A) to retrieve a new entry and begin the loop again.

Still with FIG. 6A, at box (240.6A) the client application examines the current, unhashed entry to see whether it is at the highest level of the hierarchy for the particular kind of entry. For example, using the case of the email address described above (johndoe@mail.example.com), there are four levels in the hierarchy. The lowest level of the hierarchy is "johndoe," one level up is "mail," one level up is "example," one level up, and the highest level, is "com." If the current unhashed entry is not at its highest (i.e., least specific) level in the hierarchy, the flow moves to box (241.6A) where the lowest level of the entry is stripped. Again, returning to the example of the email address (johndoe@mail.example.com), the lowest level (johndoe) would be stripped, and the new unhashed entry would be mail.example.com. The flow would then loop back to box (212.6A) where the new unhashed entry would be hashed and the process would repeat. Returning to box (240.6A), if the current entry is at its highest level then the flow returns to box (210.6A). The client application determines whether there are entries remaining on the sender's list to be hashed (210.6A). Once all the entries on the sender's list have been processed, the flow moves to box (250.6A). The client application reads the queue of hashed entries (250.6A). The client application then generates a file of hashed entries and any associated information to be sent to the satellite server (260.6A). The flow proceeds to box (261.6A) where the client application contacts and transmits the file of hashed entries and any associated information to the satellite server. The client application then finishes the processing of the sender's list (270.6A). As specified earlier, the client application waits for a response from the satellite server in order to report which entries on the sender's original list must be removed or sent to. In one embodiment of the invention the relationships between contact points in the hierarchy are stored so they can be reconstructed when the results are received from the satellite server.

Figure 7:
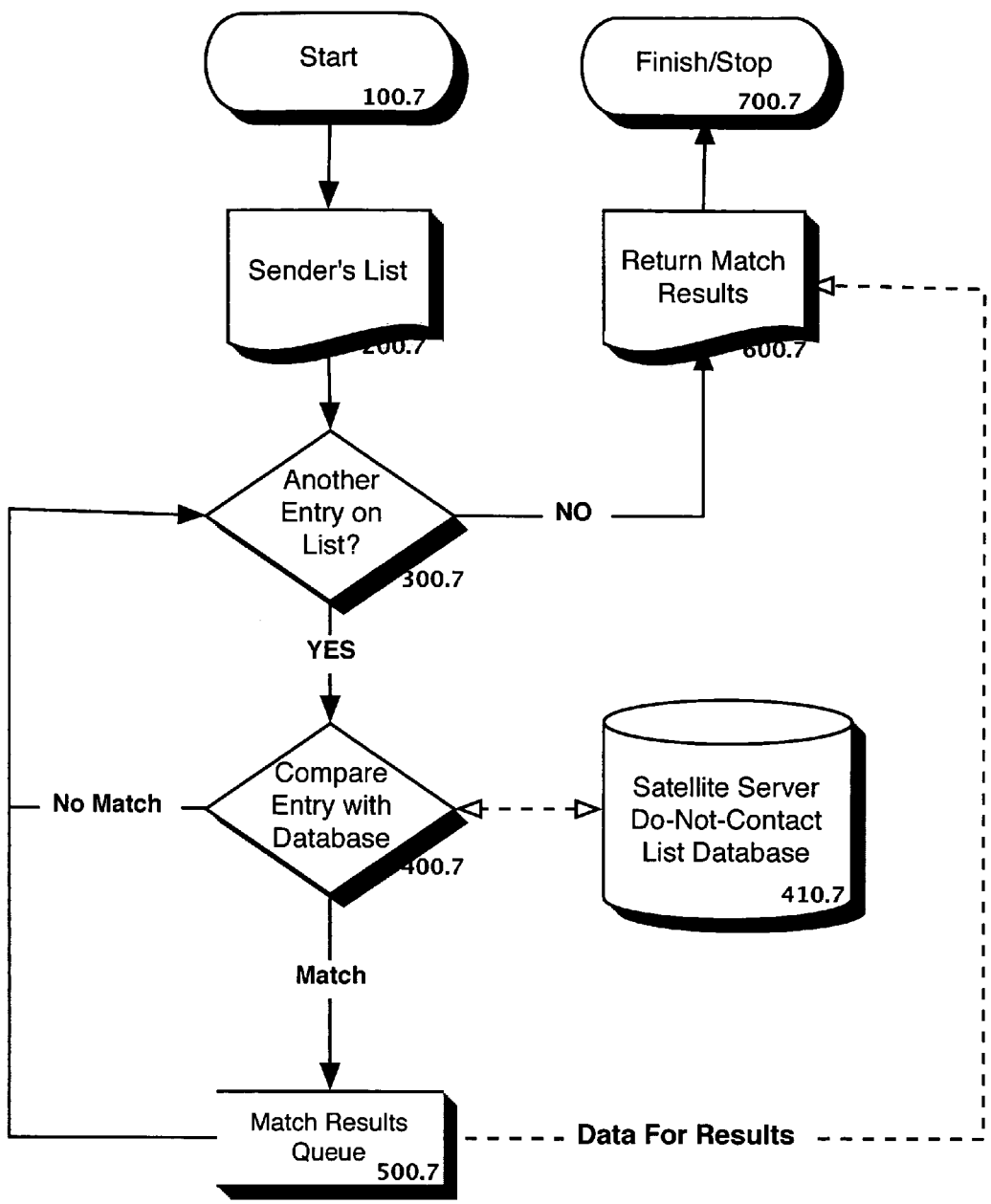
FIG. 7 is an exemplary flow chart of a satellite processing a sender's list according to one embodiment of the invention.

FIG. 7 is an exemplary flow chart of a process that can be performed by a satellite server as previously described in FIG. 5. In one embodiment of the invention, as illustrated in FIG. 7, the satellite server processes a list of contact points received from a client application. The process begins at box (100.7) when a sender's list is received from the client application as illustrated at box (200.7). In one embodiment, once a sender's list is received from a client application the satellite server begins a loop.

Still with FIG. 7, first the satellite server checks to see if there are any entries on a particular sender's list that have not yet been checked as illustrated at box (300.7). If there is another entry on the sender's list then the entry is checked against the satellite server's database at box (400.7). The satellite server's do-not-contact list database (410.7) contains all the entries of the satellite server as well as the particular category rules that apply to each entry. The satellite server's database (410.7) and query functions can be implemented using any well-known database techniques (e.g., the use of database management systems using Structured Query Language (SQL)). If there is no match then the satellite server continues through its loop and finds then next entry on the sender's list at box (300.7). If the contact point from the sender's list appears on the satellite server's database (410.7) then the contact point is stored in a queue along with any rules that apply to that entry as illustrated at box (500.7). The satellite server then continues with the its loop and looks to see if there are any other unchecked entries remaining on the sender's list at box (300.7). Once all the entries on the sender's list have been checked the loop exits and the satellite server reads from the match results queue at box (500.7) and returns to the client application the list of contact points that appeared on the do-no-contact list as well as the category rules that apply to each contact point at box (600.7). If hashing or encryption is used, it is practically impossible for the satellite server to discover the original (unencrypted or unhashed) contact points that were transmitted from the client application whether they were matched or unmatched. As a result, the sender's list remains secret and is not revealed to the individual, business, or government that maintains the no-contact registry. The satellite server completes the instance of this check at box (700.7). The satellite server can continue to receive other jobs from client applications.

In one embodiment of a hierarchical implementation, the registry may also allow the additional flag "override below" which allows a registration at the top of the hierarchy to override the settings of those below (e.g., the settings for example.com can override the settings for johndoe@example.com). Under one implementation of the invention that allows hierarchical registrations, the sender's list uploaded to the satellite server includes all the hierarchy levels for each entry on the sender's list. As described in FIG. 7, these hierarchy levels are looped through and compared with the satellite server's do-not-contact list database (400.7). If none of the hierarchy of contact points matches any entry in the registry, then the desired contact point is not in the registry. If any level of the hierarchy appears on the registry, then the satellite server reports back that the level is on the registry as a match (600.7).

Figure 7A:
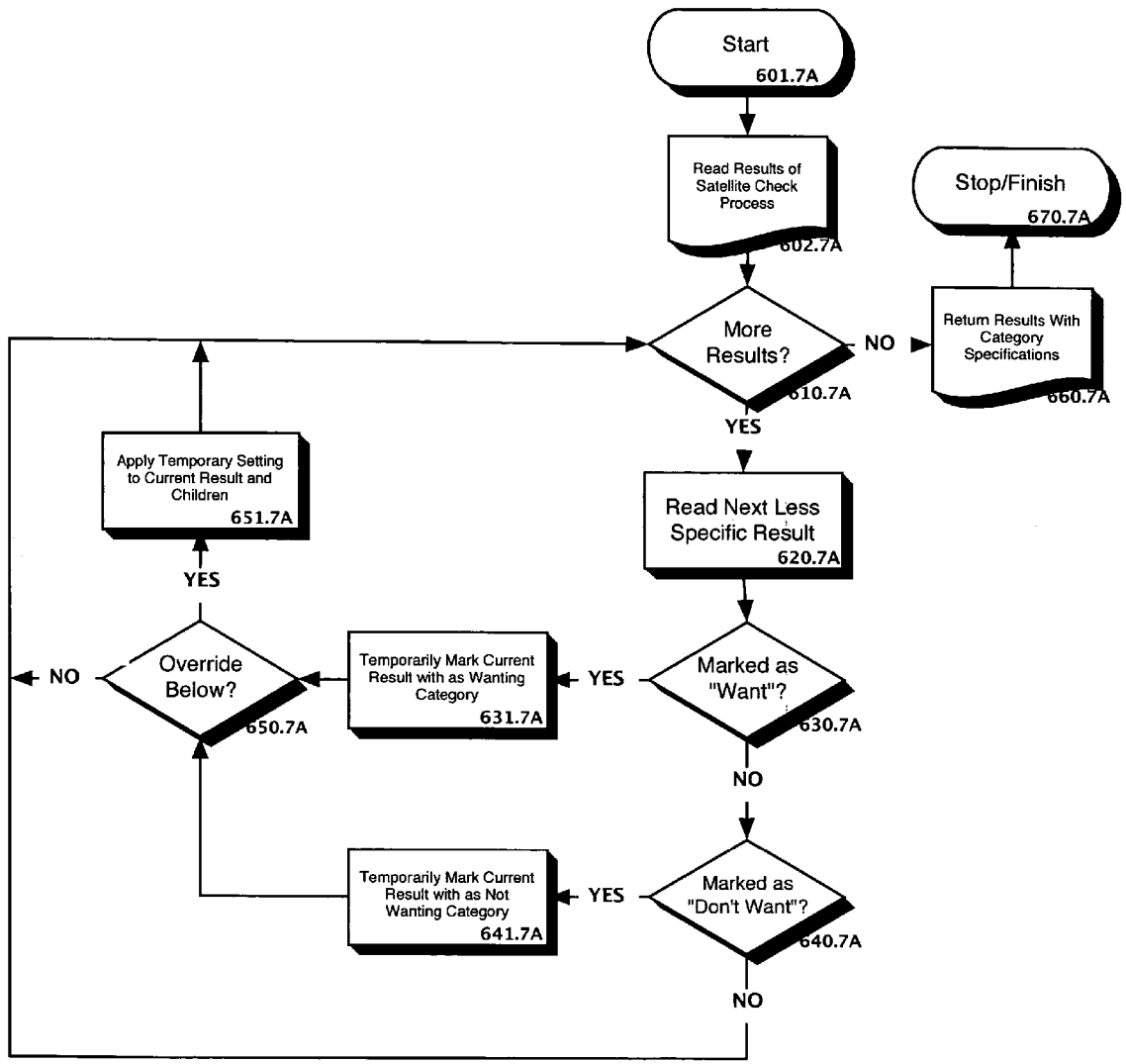
FIG. 7A is an exemplary flow chart of a satellite server post-processing results of a check for a registry which contains hierarchical registrations according to one embodiment of the invention.

FIG. 7A describes the process of determining what category rules apply to a contact point under an embodiment of the invention that includes hierarchical registrations. Under one such implementation of the invention, before returning the results to the client application the satellite server begins a category determination process (601.7A). The satellite server reads the matched results to be returned to the client application (602.7A). The satellite server determines whether there are more results to check at box (610.7A). If so, under one particular embodiment, to determine the effective value of a category for a contact point, the satellite server reads the rules that apply to least specific contact point of the hierarchy for the desired contact point found in the registry (620.7A). For example, using email as an example, if johndoe@example.com is registered and example.com is also registered, the satellite server begins with the rules for example.com because it is further up the hierarchy and therefore less specific. The satellite server checks if the rules mark the category as being "wanted" by the registrant (630.7A). If a category is marked as wanted then the satellite server temporarily marks the current result and category as "want" in box (631.7A). If the category is not marked as "want" then the satellite server checks to see if the category for the result is marked as "don't want" (640.7A). If the category is not marked as "don't want" then the satellite server assumes the result does not care about the category and the flow returns to read more results and categories at box (610.7A). If a category is marked as not wanted then the satellite server temporarily marks the current result and category as "don't want" in box (641.7A).

Still with FIG. 7A, the satellite then reads the rules that apply to this particular result in box (650.7A). If the rules apply to the children of the result (e.g., the more specific entries in the hierarchy) then the temporary settings are applied to the result and any children in box (651.7A). Those results are children are also removed from the results remaining to be checked and the flow returns to box (610.7A). If in box (650.7A) the rules for the particular result do not apply to its children, the particular result, but not its children are removed from the queue of results to check, and the flow returns to box (610.7A). As soon as all the results and categories have been checked, the flow moves to box (660.7A). The results are collected and returned to the client application with the appropriate category rules applies to all the levels of the hierarchy (660.7A). Under one embodiment of the invention, the relationships between the contact points in the hierarchy may also be returned to the client application. In an alternative embodiment, the client application reassembles the relationships based on the originally transmitted hierarchy. The satellite server then completes the hierarchical checking process at box (670.7A).

In one embodiment of the invention, the categories are processed together in the processing for each group of contact points. In another embodiment of the invention, each group of contact points is given a group ID and all the contact points in all the groups (i.e., along each hierarchy) are combined in a partial order, so as to reduce the number of times a not-very-specific contact point needs to be looked up in the satellite server's database. In one embodiment of the invention, the hierarchy for each contact point in the sender's list is maintained as a separate group in transfer to the satellite server at box (261.6A) and the satellite server processes each group according to the process in FIG. 7A. In another embodiment of the invention, each element of each hierarchy is transferred to the satellite server in box (261.6A) along with the next less specific level of that hierarchy, if any. The satellite server then uses these references to the next less specific level of the hierarchy to perform the operation in box (620.7A). In another embodiment of the invention, each of the levels of all of the hierarchies are combined into one list to transfer to the satellite server at box (261.6A). The satellite server returns to the client application the categories that apply to the entries of the hierarchies. The client application follows the process in FIG. 7A, regenerating the hierarchies by stripping and hashing the sender's list according to FIG. 6A, and then using the sequence in the regenerated hierarchies in box (620.7A).

Figure 8:
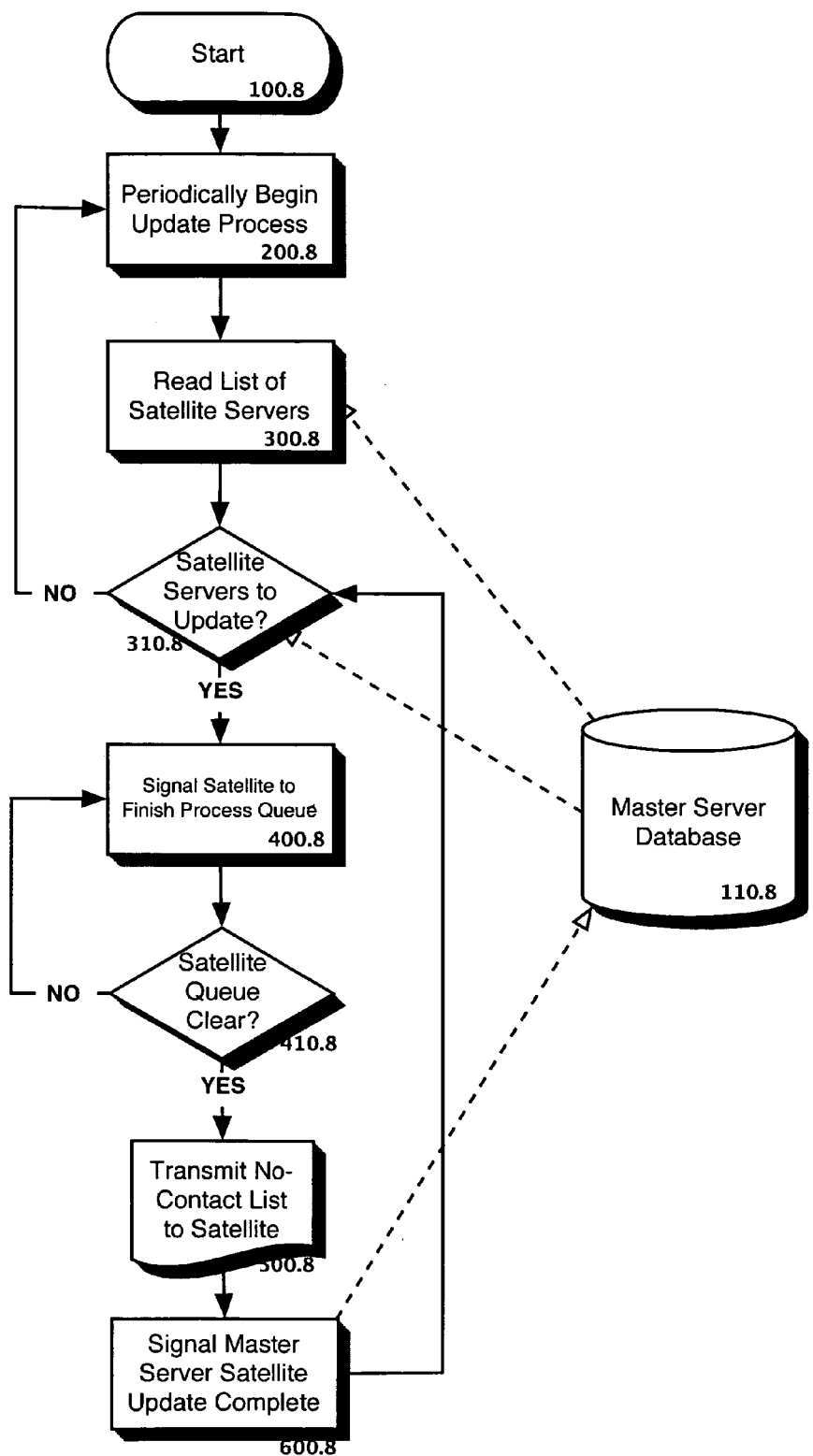
FIG. 8 is an exemplary flow chart of a satellite being updated by a central database according to one embodiment of the invention.

Returning to FIG. 1, in one embodiment, the multiple satellite servers (500.1) receive periodic updates from the central master server (100.1). FIG. 8 is an exemplary flow chart of an update process according to one embodiment of the invention where a central master server (100.1) periodically updates the multiple satellite servers (500.1). When the update process starts at box (100.8), the master server periodically begins the update process at box (200.8). The master server reads a list of satellite servers at box (300.8). The list of satellite servers is stored in the master server database (110.8) along with the master do-not-contact list. The master server determines whether any of the satellite servers are in need of an update based on the timestamp of the satellite servers' last update at box (310.8). In one embodiment of the invention, the timestamps use some universal time, such as GMT, to identify when entries are created. If there are no satellite servers to update then the master server finishes the update process and waits a specified period of time before beginning again as illustrated at box (200.8).

If there are satellite servers to update then the master server reads one of the satellite servers to update and signals it to finish its client process queue at box (400.8). This signal instructs the satellite server to complete any pending sender list checks and stop accepting new sender's contact list. The master server periodically checks the satellite server in order to see if its process queue is complete as shown at box (410.8). If the queue is not clear then the master server signals the satellite server again and waits for the queue to clear at box (400.8). As soon as the satellite server's process queue is clear and in one embodiment, has shut itself down from accepting further updates or senders contact lists, the master server transmits the current do-not-contact list to the satellite server at box (500.8).

In one embodiment of the invention, the entire do-not-contact list is transmitted to the satellite server and overrides the existing satellite server's database. In an alternative embodiment, the master server transmits only the changes that have taken place, or been received, since the last update of the particular satellite server. Depending on the embodiment of the invention, these updates can be signed as authentic using a cryptographically secure digital signature (e.g., Digital Signature Standard or DSS). The transmission between the master server and the satellite server can also be protected by SSL encryption or other encryption depending on the particular embodiment of the invention. Once the update has been transmitted, the satellite server signals the master server that the update has been successful and the master server signals the satellite server the update is complete as shown at box (600.8). In one embodiment, the signal that the update is complete also instructs the satellite server to begin accepting queries from client applications.

In an alternative embodiment of this invention, the transmission of the update from the master server to the satellite server occurs in parallel with ordinary processing and only the updating of the database occurs while no queries are being processed from client applications. The master server continues its loop and finds the next satellite server to be updated at box (310.8) until all the satellite servers have been updated and the update process is finished, at which point, the master server returns to periodically update the process as shown at box (200.8). In an alternative embodiment of this invention, multiple satellite servers can be updated in parallel from the same central master server.

Figure 9:
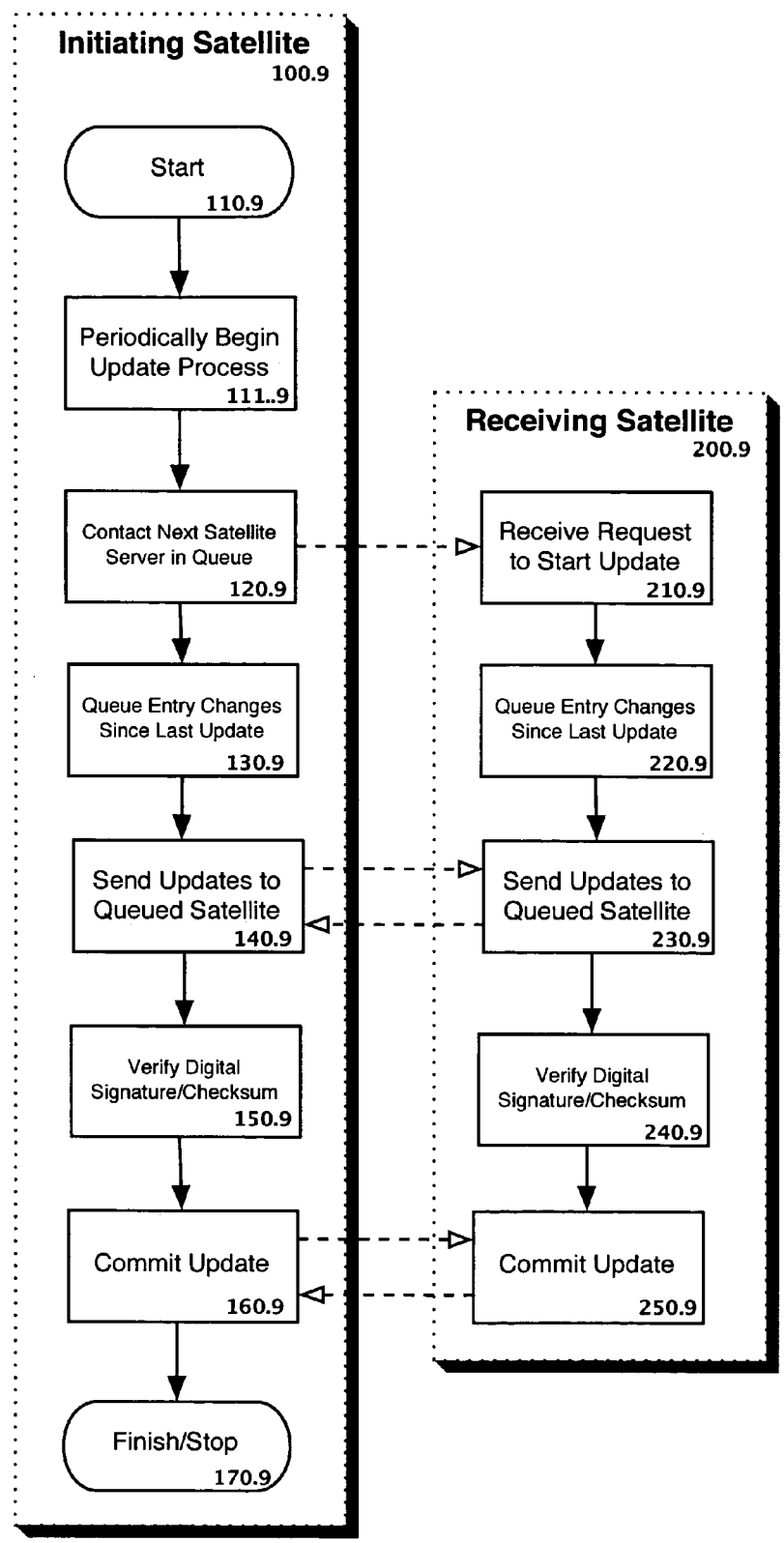
FIG. 9 is an exemplary block diagram of two satellites updating from each other's lists when there is no central database according to one embodiment of the invention.

As previously mentioned, (FIG. 2), under an alternative embodiment of the invention there is no central master server; and under this embodiment, the update process is somewhat different from what was described in FIG. 8. In one embodiment, satellite servers update one another for the do-not-contact list and/or specific category for the do-not-contact list. FIG. 9 is an exemplary box diagram of the process where two satellite servers update their databases without a central master server. In one embodiment, an update occurs between an initiating satellite server (100.9) and a receiving satellite server (200.9). The initiating satellite server (100.9) begins an update at box (110.9) after a specified period of time as illustrated by box (111.9). In one embodiment, the initiating satellite server (100.9) reads from the queue of other satellite servers and contacts the next server in the queue at box (120.9) for updates. The initiating satellite server (100.9) then queues any entries added to the initiating satellite server's (100.9) database since the last update with the receiving satellite server (200.9) in an update at box (130.9).

The initiating satellite server (100.9) then sends the new entries in the update queue to the receiving satellite server (200.9) at box (140.9). The initiating satellite server (200.9) also receives any new entries from the receiving satellite server (100.9) from its own update queue at box (140.9). Depending on the particular embodiment of the invention, these updates from the receiving satellite server (200.9) can be digitally signed and the signatures can be verified by the initiating satellite server (100.9) before the updates from the receiving satellite server (200.9) is accepted at box (150.9). Similarly, these updates from the initiating satellite server (100.9) can be digitally signed and the signatures can be verified by the receiving satellite server (200.9) before the updates from the initiating satellite server (100.9) is accepted at box (240.9).

After the digital signature of the receiving satellite server's (200.9) update list has been verified, the new entries from the receiving satellite server's (200.9) update queue are incorporated into the initiating satellite server's (100.9) database and the changes are committed at box (160.9). The update process then completes (170.9). The receiving satellite server (200.9) follows a similar process. After the initiating satellite server's (100.9) update list has been verified, the new entries from the initiating satellite server's (100.9) update queue are incorporated into the receiving satellite server's (200.9) database and the changes are committed at box (250.9). The update process then completes.

In one embodiment, after being contacted by the initiating satellite server (100.9) at box (210.9), the receiving satellite server (200.9) builds a queue of new entries since the last update of the initiating satellite server (100.9) at box (220.9). The receiving satellite server (200.9) both accepts the initiating satellite server's (100.9) update list as well as sending its own updates to the initiating satellite server (100.9) at box (230.9). The receiving satellite server (200.9) verifies the digital signature of the initiating satellite server's (100.9) update at box (240.9) and, if it verifies, adds the new entries from the initiating satellite server (100.9) to the receiving satellite server's database (250.9).

Figure 10:
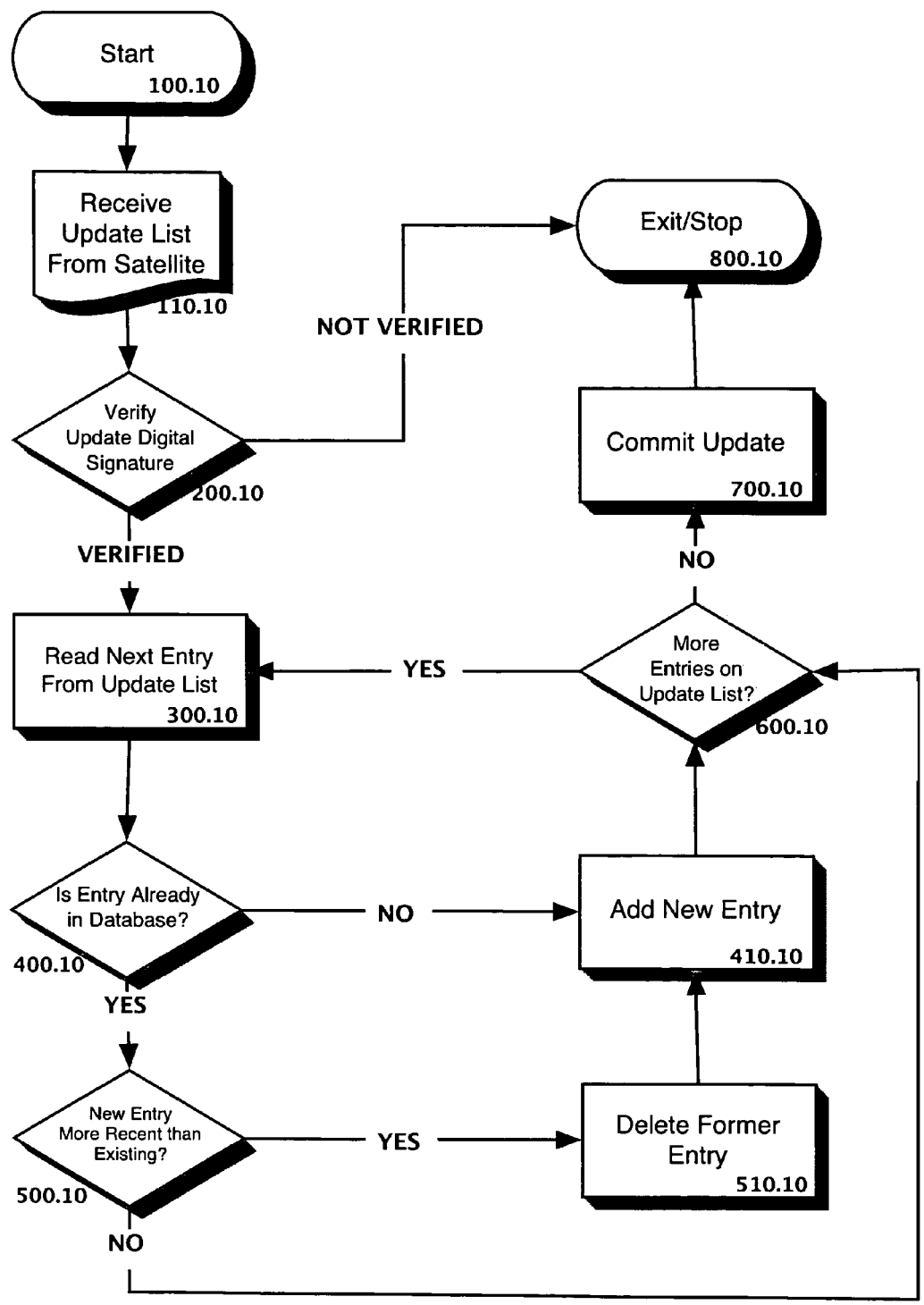
FIG. 10 is an exemplary flow chart of the update process of a satellite when there is no central database according to one embodiment of the invention.

FIG. 10 is an exemplary flow chart of a process of appending an update of a satellite server to the database as described in FIG. 9. Under one embodiment of the invention, when the update process begins at box (100.10), a satellite server receives an update list from another satellite server at box (110.10). The satellite server first checks the digital signature and any checksum of the update file at box (200.10). The digital signature may be based on pre-exchanged public/private keys, such as is used in typical digital signature standards, e.g., DSS, etc . . . The checksum may be a hash of the entire update file or a portion thereof, e.g., using MD5, SHA1, etc . . . If the checksum or digital signature does not verify then the satellite server exits the update process and signals the satellite server that has sent the update that there was an error as shown at box (800.10). If the digital signature and checksum of the update do verify then the update entries are read one by one from the update list at box (300.10).

Next, at box (400.10), the satellite server checks against its own database to see whether the update entry is already on the satellite server's database. If the update is not already in the satellite server's database then it is added at box (410.10). If the update entry is already in the satellite server's database then the satellite server checks the timestamp of the existing entry at box (500.10) to see if the update (new) entry is more recent than the existing entry. The timestamp indicates when the entry was verified, as described in FIG. 4 at box (500.4). If the timestamp of the update entry is later than the existing satellite server's entry, then the existing satellite server's entry is deleted or marked in the database as non-authoritative at box (510.10). In another embodiment of this invention, the entries with the older timestamps are retained unchanged, as only the entry with the latest timestamp is used for future checks against the registry. The update entry is then added to the satellite server's database at box (410.10). If the update entry's timestamp is earlier or the same as the existing satellite server's entry then no changes to the database are made. In another embodiment of this invention, update entries with an earlier timestamp are added anyway to the satellite server, because they will be overridden by the newer entry. At box (600.10), after a particular entry has been processed, the satellite server checks to see if there are more entries on the update to be processed. If the queue from the update is clear, the satellite server commits the update to the database at box (700.10) and the process exits and informs the updating satellite server of success at box (800.10).

In one embodiment of the invention, data in each server's do-not-contact list is append only, that is, entries are added and normally not deleted. In this case, if a registrant desires no longer to appear in the do-not-contact list, then a new entry is created indicating that there is no current registration as of that time. The use of an append-only do-not-contact list improves the resiliency of the system to attack. For example, if crackers were to be successful in taking over a satellite server and tried to delete the do-not-contact list, no entries would be deleted by other satellite servers. Rather, the other satellite servers would merely have added to them the "no current registration" entries. Those rogue entries could be manually removed or further overridden by the previously valid entries.

In one embodiment of the invention, the satellite servers incrementally synchronize each other, and transfer data obtained from other satellite servers. Each satellite server maintains a table of the latest timestamps of updates received from each of the registration servers. When two satellite servers incrementally synchronize, they compare the two tables. For each of the registration servers in the list, if satellite server A has an later timestamp than satellite server B, then satellite server A sends to satellite server B in box (110.10) the entries from this registration server that are after the timestamp for satellite server B. In this case, the tests in box (400.10) and box (500.10) are unnecessary, and box (410.10) is performed for each entry transmitted from satellite server A to satellite server B. In one embodiment of the invention, the table of latest timestamps also includes the number of entries from each registration server. A check is made when sending entries for a registration server from satellite server A to satellite server B to ensure that the number of entries being sent matches the difference between the numbers of entries in the two tables for this registration server. If the check fails, then a check is made to see if the problem is due to rogue entries, in which case they are removed and processing resumes. If the check fails and the problem cannot be explained by the presence of rogue entries, then the synchronization process is aborted and maintenance personnel are alerted.

In one embodiment of the invention, the entry associated with each contact point and a timestamp is digitally signed (e.g., using the Digital Signature Standard (DSS)). When an entry is transmitted from one satellite server to another, the process is aborted if an entry is not properly digitally signed by the originating registration server. If, however, the entry appears on a list of known rogue entries, this entry is skipped, the event is logged, and the process otherwise continues normally. This approach prevents forgery of contact point registrations, thereby further insulating the system from attack. The use of a list of known rogue entries helps to prevent the use of forgeries to launch a denial of service attack on the system. In one embodiment of the invention, the entry associated with each contact point and a timestamp is digitally signed by the sending satellite server when it is sent in box (110.10). At the cost of extra space, the digital signatures provide an audit trail that can be used to help detect and repair attacks.

In one embodiment of the invention, when attacks have occurred, registration data is gathered from all the registration servers and/or satellite servers, then combined into one database, erroneous entries are removed, and then the cleaned database is distributed to the various satellite servers. This technique is used to recover from disasters or widespread attacks. In one embodiment of the invention, all registration servers periodically send their new registrations to one or more archive servers that gather the registrations for safekeeping. This approach speeds up or facilitates recovery in the event of disaster or widespread attack.

In one embodiment of the invention, write-once media, such as CD-R's or DVD-R's are used to maintain a log of contact point registrations received. In one embodiment of the invention, when one satellite server A propagates a registration of a contact point to another satellite server B in a synchronization process, the satellite server A digitally signs (including the time) the transferred entry to maintain the propagation history of this entry. These techniques allow for detection and correction of attacks that might arise.

ADDITIONAL EMBODIMENTS

While the invention has been described in terms of several embodiments, those skilled in the art will recognize that the invention is not limited to the embodiments described. For brevity, variations of the embodiments specifically mentioned in one part of the description can also apply to other parts of the description even where not mentioned. For example, the description of the master server being a single device, multiple devices, or implemented using an multi-tiered architecture also applies to other servers; firewalls and other security devices can be used anywhere in the system; and encrypted communication, such as by SSL, can be used anywhere. The method and apparatus of the invention can be practiced with modification and alteration with the spirit and scope of the appended claims. The descriptions provided are thus to be regarded as illustrative instead of limiting on the invention.

What is claimed is:

1. A computer implemented method comprising:
    receiving, at a satellite server, a plurality of contact points of a do-not-contact list from a master server coupled with the satellite server, each of the contact points being encrypted with an encryption scheme, wherein registrants register with the master server to provide registrant contact points to be on the do-not-contact list of the master server, and wherein the satellite server is one of a plurality of satellite servers coupled with the master server, and wherein the plurality of contact points of the do-not-contact list received from the master server each includes one or more categories that a registrant contact point does not want to receive;
    generating a do-not-contact list for the satellite server from the received encrypted contact points, the satellite server's do-not-contact list including the plurality of encrypted contact points received from the master server;
    receiving, at the satellite server, a list of a plurality of contact points from a sender that have each been encrypted with the same encryption scheme as was used to encrypt the plurality of contact points received from the master server, wherein a plurality of unencrypted contact points corresponding to the plurality of encrypted contact points received from the sender are not revealed to the satellite server, and wherein the plurality of encrypted contact points are received from the sender as a result of the sender requesting the corresponding plurality of unencrypted contact points be scrubbed against the satellite server's do-not-contact list without revealing the unencrypted contact points to the satellite server;
    comparing the list of the plurality of encrypted contact points received from the sender to the satellite server's do-not-contact list;
    reporting to the sender any encrypted contact point on the list of encrypted contact points received from the sender that appears on the satellite server's do-not-contact list, and for each of those encrypted contact points, reporting to the sender a category of message that may not be sent to a contact point corresponding to that encrypted contact point.

2. The method as in claim 1 wherein the one or more categories that the registrant contact point does not want to receive are stored in a relational database.

3. The method as in claim 1 wherein the registrant accesses the master server in order to register the registrant contact point.

4. The method as in claim 1 further comprising:
    providing a website for the registrant to register the registrant contact point with the master server.

5. The method as in claim 4 wherein the registrant registers the registrant contact point with the master server directly.

6. The method as in claim 1 further comprising:
    providing an intermediary registration server which passes the registrant contact point to the master server.

7. The method as in claim 1 wherein the plurality of contact points received from the master server includes only changes to the those contact points of the do-not-contact list that have not been received by the satellite server.

8. The method as in claim 1 further comprising:
    updating the satellite server's do-not-contact list responsive to receiving additional contact points of the do-not-contact list from the master server.

9. The method as in claim 1 wherein any of the contact point includes any one of electronic contact point whose address can be represented in an alphanumeric form, electronic mail address, instant messenger identifier, telephone number, facsimile number, mobile phone number, domain name, subdomain name, and pager number.

10. The method as in claim 1 further comprising:
    receiving, at the satellite server, a set of one or more categories of messages to be sent by the sender; and
    reporting to the sender those of the encrypted contact points on the list of the plurality of contact points received from the sender that appear on the satellite server's do-not-contact list whose corresponding contact point does not want to receive messages of at least one of the sender's categories.

11. The method as in claim 1 wherein the master server is one of implemented on a single device, implemented in a distributed scheme, and implemented on a multiple devices in one or more networks and implemented using a multi-tier architecture.

12. The method as in claim 2 wherein the relational database is formed by:
    storing the categories in a category table;
    assigning a category identification to each of the categories;
    storing the registrant contact points in a contact point table;
    assigning contact point identifications to the registrant contact points; and
    associating the category identification with the contact point identification to provide one or more category preferences for each of the registrant contact points.

13. The method as in claim 12 wherein the category preferences include at least one of "don't want," "want," and "do not care" to receive a particular category message.

14. The method as in claim 1 further comprising:
    providing a website for each registrant to register more than one registrant contact points at a time with the master server.

15. The method as in claim 14 wherein each registrant registers the registrant contact points with the master server directly.

16. The method as in claim 1 wherein each contact point is registered with the master server in a hierarchy of contact points.

17. A computer implemented method comprising:
    receiving, at a satellite server, a plurality of contact points from one or more of a plurality of other satellite servers, each of the contact points being encrypted with an encryption scheme, wherein registrants provide registrant contact points by registering with any of the satellite servers or registering with an intermediary server communicable with any of the satellite servers;
    updating a do-not-contact list of the satellite server with the plurality of contact points received from the other satellite servers;

receiving, at the satellite server, a list of a plurality of contact points from a sender that have each been encrypted with the same encryption scheme as was used to encrypt the plurality of contact points received from the other satellite servers, wherein a plurality of unencrypted contact points corresponding to the plurality of encrypted contact points received from the sender are not revealed to the satellite server, and wherein the plurality of encrypted contact points are received from the sender as a result of the sender requesting the corresponding plurality of unencrypted contact points be scrubbed against the satellite server's do-not-contact list without revealing the unencrypted contact points to the satellite server;

comparing the list of the plurality of encrypted contact points received from the sender to the satellite server's do-not-contact list;

reporting to the sender any encrypted contact point on the list of encrypted contact points received from the sender that appear on the satellite server's do-not-contact list, and for each of those encrypted contact points, reporting to the sender a category of message that may not be sent to a contact point corresponding to that encrypted contact point.

18. The method of claim 17 wherein each registrant provides that the registrant contact point may not be contacted.

19. The method of claim 17 further comprising each registrant providing one or more category preferences for the registrant contact point, wherein at least one of the one or more category preferences indicates that communication corresponding to that category may not be sent to the registrant contact point.

20. The method of claim 17 wherein each registrant provides that the registrant contact point may be contacted.

21. The method of claim 19 wherein each registrant registers with any of the satellite servers to provide the one or more category preferences corresponding to the registrant contact point.

22. The method of claim 20 further comprising:
reporting to the sender, for at least some of the encrypted contact points on the list of encrypted contact points received from the sender that appear on the satellite server's do-not-contact list, a category of message that may be sent to a contact point corresponding to that encrypted contact point.

23. The method of claim 20 further comprising:
receiving, at the satellite server, a set of one or more categories of messages to be sent by the sender; and
reporting to the sender those of the encrypted contact points on the list of encrypted contact points received from the sender that appear on the satellite server's do-not-contact list and that want to receive messages of at least one of the sender's categories.

24. The method of claim 17 wherein any of the contact points includes any one of electronic contact point whose address can be represented in an alphanumeric form, electronic mail address, instant messenger identifier, telephone number, facsimile number, mobile phone number, domain name, subdomain name and pager number.

25. The method of claim 17 further comprising:
receiving, at the satellite server, a set of one or more categories of messages to be sent by the sender; and
reporting to the sender those of the encrypted contact points on the list of encrypted contact points received from the sender that appear on the satellite server's do-not-contact list and that does not want to receive messages of at least one of the sender's categories.

26. The method as in claim 19 wherein the one or more category preferences that the registrant contact point does not want to receive are stored in a relational database.

27. The method as in claim 26 wherein the relational database is formed by:
storing the one or more categories in a category table;
assigning a category identification to each of the one or more categories;
storing the registrant contact points in a contact point table;
assigning contact point identifications to the registrant contact points; and
associating the category identification with the contact point identification to provide one or more category preferences for each of the registrant contact points.

28. The method as in claim 27 wherein the category preferences include at least one of "don't want," "want," and "do not care" to receive a particular category message.

29. The method as in claim 17 further comprising:
providing a website for each registrant to register one or more registrant contact points at a time.

30. The method as in claim 29 wherein each registrant registers the registrant contact points with any one of the satellite servers directly and not through an intermediary server.

31. The method as in claim 17 wherein each registrant contact point is registered with the master server in a hierarchy of contact points.

32. The method of claim 17 further comprising:
providing a plurality of satellite servers, each satellite server configured to receive one or more contact points from senders and configured to periodically generate and receive updates from one or more satellite servers.

33. A computer implemented method comprising:
receiving, at a satellite server, one or more contact points of a do-not-contact list from a master server coupled with the satellite server, each of the contact points being encrypted with an encryption scheme and each being associated with one or more categories, wherein each encrypted contact point is further associated with a value for each of those associated categories which indicates whether communication is desired for that category, wherein one or more registrants register with the master server to provide one or more contact points, wherein the one or more contact points of the do-not-contact list received from the master server includes at least one of one or more categories that particular registrant contact points do not want to receive and one or more categories that particular registrant contact points want to receive, and wherein the satellite server is one of a plurality of satellite servers coupled with the master server;
generating a do-not-contact list for the satellite server from the received encrypted contact points;
receiving, at the satellite server, a list of one or more contact points from a sender each being encrypted with the same encryption scheme as was used to encrypt the one or more contact points received from the master server, wherein one or more unencrypted contact points corresponding to the one or more encrypted contact points received from the sender are not revealed to the satellite server;
comparing the list of one or more encrypted contact points received from the sender to the satellite server's do-not-contact list; and
reporting to the sender any encrypted contact point on the list of one or more encrypted contact points received from the sender that appears on the satellite server's do-not-contact list, and for each of those matching encrypted contact points, reporting to the sender at least a category of message that may not be sent to a contact point that corresponds with that encrypted contact point.

34. The method as in claim 33 further comprising:
reporting to the sender, for each of those matching encrypted contact points, at least a category of message that may be sent to a contact point that corresponds with that encrypted contact point.

35. The method as in claim 33 wherein the categories of messages that each contact point does not want to receive are stored in a relational database.

36. The method as in claim 33 wherein the one or more registrants access the master server in order to register the one or more registrant contact points.

37. The method as in claim 33 further comprising:
providing a website for the one or more registrants to register the one or more registrant contact points with the master server.

38. The method as in claim 37 wherein the one or more registrants register the one or more registrant contact points with the master server directly.

39. The method as in claim 33 further comprising:
providing an intermediary registration server which passes the one or more registrant contact points to the master server.

40. The method as in claim 33 wherein the one or more contact points received from the master server includes only changes to those contact points that have not been transmitted to the satellite server.

41. The method as in claim 33 further comprising:
updating the satellite server's do-not-contact list responsive to receiving additional contact points of the do-not-contact list from the master server.

42. The method as in claim 33 wherein any of the contact point includes any one of electronic contact point whose address can be represented in an alphanumeric form, electronic mail address, instant messenger identifier, telephone number, facsimile number, mobile phone number, domain name, subdomain name, and pager number.

43. The method as in claim 33 further comprising:
obtaining a set of one or more categories of messages to be sent by the sender;
for each matching encrypted contact point and each of the set of sender's categories of messages to be sent, reporting to the sender whether a contact point corresponding to that encrypted contact point wants to receive messages of that category.

44. The method as in claim 33 wherein the master server is one of implemented on a single device, implemented in a distributed scheme, implemented on a multiple devices in one or more networks, and implemented using a multi-tier architecture.

45. A computer implemented method comprising:
receiving, at a satellite server, a plurality of contact points of a do-not-contact list from a master server coupled with the satellite server, each of the contact points being encrypted with an encryption scheme, wherein registrants register with the master server to provide registrant contact points to be on the do-not-contact list of the master server, and wherein the satellite server is one of a plurality of satellite servers coupled with the master server;
generating a do-not-contact list for the satellite server from the received encrypted contact points, the satellite server's do-not-contact list including the plurality of encrypted contact points received from the master server;
receiving, at the satellite server, a list of a plurality of contact points from a sender that have each been encrypted with the same encryption scheme as was used to encrypt the plurality of contact points received from the master server, wherein a plurality of unencrypted contact points corresponding to the plurality of encrypted contact points received from the sender are not revealed to the satellite server, and wherein the plurality of encrypted contact points are received from the sender as a result of the sender requesting the corresponding plurality of unencrypted contact points be scrubbed against the satellite server's do-not-contact list without revealing the unencrypted contact points to the satellite server;
receiving, at the satellite server, a set of one or more categories of messages to be sent by the sender;
comparing the list of the plurality of encrypted contact points received from the sender to the satellite server's do-not-contact list;
reporting to the sender any encrypted contact point on the list of encrypted contact points received from the sender that appears on the satellite server's do-not-contact list and that does not want to receive messages of at least one category of the sender.

46. The method as in claim 45 wherein the plurality of contact points of the do-not-contact list received from the master server each includes one or more categories that a registrant contact point does not want to receive.

47. The method as in claim 46 further comprising:
reporting to the sender at least a category of message that may not be sent to a contact point corresponding to an encrypted contact point from the list of the plurality of encrypted contact points received from the sender that appear on the satellite server's do- not-contact list.

48. The method as in claim 45 wherein the registrant accesses the master server in order to register the registrant contact point.

49. The method as in claim 45 further comprising:
providing a website for the registrant to register the registrant contact point with the master server.

50. The method as in claim 49 wherein the registrant registers the registrant contact point with the master server directly.

51. The method as in claim 45 further comprising:
providing an intermediary registration server which passes the registrant contact point to the master server.

52. The method as in claim 45 wherein the plurality of contact points received from the master server includes only changes to the those contact points of the do-not-contact list that have not been received by the satellite server.

53. The method as in claim 45 further comprising:
updating the satellite server's do-not-contact list responsive to receiving additional contact points of the do-not-contact list from the master server.

54. The method as in claim 45 wherein any of the contact point includes any one of electronic contact point whose address can be represented in an alphanumeric form, electronic mail address, instant messenger identifier, telephone number, facsimile number, mobile phone number, domain name, subdomain name, and pager number.

55. The method as in claim 45 wherein the master server is one of implemented on a single device, implemented in a distributed scheme, and implemented on a multiple devices in one or more networks and implemented using a multi-tier architecture.

56. The method as in claim 45 further comprising:
providing a website for each registrant to register more than one registrant contact points at a time with the master server.

57. The method as in claim 56 wherein each registrant registers the registrant contact points with the master server directly.

58. The method as in claim 45 wherein each contact point is registered with the master server in a hierarchy of contact points.

59. A computer implemented method comprising:
receiving, at a satellite server, a plurality of contact points from one or more of a plurality of other satellite servers, each of the contact points being encrypted with an encryption scheme, wherein registrants provide registrant contact points by registering with any of the satellite servers or registering with an intermediary server communicable with any of the satellite servers, and wherein the registrants provide that the registrant contact points may be contacted for at least one or more categories of messages;
updating a do-not-contact list of the satellite server with the plurality of contact points received from the other satellite servers;
receiving, at the satellite server, a list of a plurality of contact points from a sender that have each been encrypted with the same encryption scheme as was used to encrypt the plurality of contact points received from the other satellite servers, wherein a plurality of unencrypted contact points corresponding to the plurality of encrypted contact points received from the sender are not revealed to the satellite server, and wherein the plurality of encrypted contact points are received from the sender as a result of the sender requesting the corresponding plurality of unencrypted contact points be scrubbed against the satellite server's do-not-contact list without revealing the unencrypted contact points to the satellite server;
comparing the list of the plurality of encrypted contact points received from the sender to the satellite server's do-not-contact list;
reporting to the sender any encrypted contact point on the list of encrypted contact points received from the sender that appear on the satellite server's do-not-contact list; and
reporting to the sender, for each of those matching encrypted contact points, at least a category of message that may be sent to a contact point corresponding to that encrypted contact point.

60. The method of claim 59 wherein the registrants provide that at least some of the registrant contact points may not be contacted for at least one or more categories of messages.

61. The method of claim 59 further comprising each registrant providing one or more category preferences for the registrant contact point, wherein at least one of the one or more category preferences indicates that communication corresponding to that category may not be sent to the registrant contact point.

62. The method of claim 60 further comprising:
reporting to the sender, for at least some of the matching encrypted contact points, at least a category of message that may not be sent to a contact point corresponding to that encrypted contact point.

63. The method of claim 61 wherein each registrant registers with any of the satellite servers to provide the one or more category preferences corresponding to the registrant contact point.

64. The method of claim 59 further comprising:
receiving, at the satellite sever, a set of one or more categories of messages to be sent by the sender; and
reporting to the sender those of the encrypted contact points on the list of encrypted contact points received from the sender that appear on the satellite server's do-not-contact list whose corresponding contact point wants to receive messages of at least one of the sender's categories.

65. The method of claim 59 wherein any of the contact points includes any one of electronic contact point whose address can be represented in an alphanumeric form, electronic mail address, instant messenger identifier, telephone number, facsimile number, mobile phone number, domain name, subdomain name and pager number.

66. The method of claim 59 further comprising:
receiving, at the satellite server, a set of one or more categories of messages to be sent by the sender; and
reporting to the sender, those of the encrypted contact points that appear on the satellite server's do-not-contact list whose corresponding contact point does not want to receive messages of at least one of the sender's categories.

67. The method as in claim 59 further comprising:
providing a website for each registrant to register one or more registrant contact points at a time.

68. The method as in claim 67 wherein each registrant registers the registrant contact points with any one of the satellite servers directly and not through an intermediary server.

69. The method as in claim 59 wherein each registrant contact point is registered with the master server in a hierarchy of contact points.

70. The method of claim 59 further comprising:
providing a plurality of satellite servers, each satellite server configured to receive one or more contact points from senders and configured to periodically generate and receive updates from one or more satellite servers.

71. A computer implemented method comprising:
receiving, at a satellite server, a plurality of contact points from one or more of a plurality of other satellite servers, each of the contact points being encrypted with an encryption scheme, wherein registrants provide registrant contact points by registering with any of the satellite servers or registering with an intermediary server communicable with any of the satellite servers, and wherein the registrants provide that the registrant contact points may be contacted for at least one or more categories of messages;
updating a do-not-contact list of the satellite server with the plurality of contact points received from the other satellite servers;
receiving, at the satellite server, a list of a plurality of contact points from a sender that have each been encrypted with the same encryption scheme as was used to encrypt the plurality of contact points received from the other satellite servers, wherein a plurality of unencrypted contact points corresponding to the plurality of encrypted contact points received from the sender are not revealed to the satellite server, and wherein the plurality of encrypted contact points are received from the sender as a result of the sender requesting the corresponding plurality of unencrypted contact points be scrubbed against the satellite server's do-not-contact list without revealing the unencrypted contact points to the satellite server;

receiving, at the satellite sever, a set of one or more categories of messages to be sent by the sender;

comparing the list of the plurality of encrypted contact points received from the sender to the satellite server's do-not-contact list; and reporting to the sender any encrypted contact point on the list of encrypted contact points received from the sender that appear on the satellite server's do-not-contact list and that want to receive messages of at least one the sender's categories.

72. The method of claim 71 wherein the registrants provide that at least some of the registrant contact points may not be contacted for at least one or more categories of messages.

73. The method of claim 71 further comprising each registrant providing one or more category preferences for the registrant contact point, wherein at least one of the one or more category preferences indicates that communication corresponding to that category may not be sent to the registrant contact point.

74. The method of claim 72 further comprising:
reporting to the sender, for at least some of the matching encrypted contact points, at least a category of message that may not be sent to a contact point corresponding to that encrypted contact point.

75. The method of claim 73 wherein each registrant registers with any of the satellite servers to provide the one or more category preferences corresponding to the registrant contact point.

76. The method of claim 71 further comprising:
reporting to the sender, for at least some of the matching encrypted contact points, at least a category of message that may be sent to a contact point corresponding to that encrypted contact point.

77. The method of claim 71 wherein any of the contact points includes any one of electronic contact point whose address can be represented in an alphanumeric form, electronic mail address, instant messenger identifier, telephone number, facsimile number, mobile phone number, domain name, subdomain name and pager number.

78. The method of claim 71 further comprising:
reporting to the sender those of the encrypted contact points that appear on the satellite server's do-not-contact list whose corresponding contact point does not want to receive messages of at least one of the sender's categories.

79. The method as in claim 71 further comprising:
providing a website for each registrant to register one or more registrant contact points at a time.

80. The method as in claim 79 wherein each registrant registers the registrant contact points with any one of the satellite servers directly and not through an intermediary server.

81. The method as in claim 71 wherein each registrant contact point is registered with the master server in a hierarchy of contact points.

82. The method of claim 71 further comprising:
providing a plurality of satellite servers, each satellite server configured to receive one or more contact points from senders and configured to periodically generate and receive updates from one or more satellite servers.

83. A computer implemented method comprising:
receiving, at a satellite server, a plurality of contact points from one or more of a plurality of other satellite servers, each of the contact points being encrypted with an encryption scheme, wherein registrants provide registrant contact points by registering with any of the satellite servers or registering with an intermediary server communicable with any of the satellite servers;

updating a do-not-contact list of the satellite server with the plurality of contact points received from the other satellite servers;

receiving, at the satellite server, a list of a plurality of contact points from a sender that have each been encrypted with the same encryption scheme as was used to encrypt the plurality of contact points received from the other satellite servers, wherein a plurality of unencrypted contact points corresponding to the plurality of encrypted contact points received from the sender are not revealed to the satellite server, and wherein the plurality of encrypted contact points are received from the sender as a result of the sender requesting the corresponding plurality of unencrypted contact points be scrubbed against the satellite server's do-not-contact list without revealing the unencrypted contact points to the satellite server;

receiving, at the satellite server, a set of one or more categories of messages to be sent by the sender;

comparing the list of the plurality of encrypted contact points received from the sender to the satellite server's do-not-contact list; and reporting to the sender any encrypted contact point on the list of encrypted contact points received from the sender that appear on the satellite server's do-not-contact list and whose corresponding contact point does not want to receive messages of at least one of the set of categories of the sender.

84. The method of claim 83 wherein the registrants provide that the registrant contact points may not be contacted for at least one or more categories of messages.

85. The method of claim 83 further comprising each registrant providing one or more category preferences for the registrant contact point, wherein at least one of the one or more category preferences indicates that communication corresponding to that category may not be sent to the registrant contact point.

86. The method of claim 83 further comprising:
reporting to the sender, for at least some of the encrypted contact points received from the sender that appear on the satellite server's do-not-contact list, at least a category of message that may not be sent to a contact point corresponding to that encrypted contact point.

87. The method of claim 83 wherein the registrants provide that the registrant contact points may be contacted for at least one or more categories of messages;

88. The method of claim 85 wherein each registrant registers with any of the satellite servers to provide the one or more category preferences corresponding to the registrant contact point.

89. The method of claim 87 further comprising:
reporting to the sender, for at least some of the encrypted contact points received from the sender that appear on the satellite server's do-not-contact list, at least a category of message that may be sent to a contact point corresponding to that encrypted contact point.

90. The method of claim 87 further comprising:
reporting to the sender any encrypted contact point on the list of encrypted contact points received from the sender that appear on the satellite server's do-not-contact list that wants to receive messages of at least one of the sender's categories.

91. The method of claim 83 wherein any of the contact points includes any one of electronic contact point whose address can be represented in an alphanumeric form, electronic mail address, instant messenger identifier, telephone number, facsimile number, mobile phone number, domain name, subdomain name and pager number.

92. The method as in claim 83 further comprising:
providing a website for each registrant to register one or more registrant contact points at a time.

93. The method as in claim 92 wherein each registrant registers the registrant contact points with any one of the satellite servers directly and not through an intermediary server.

94. The method as in claim 83 wherein each registrant contact point is registered with the master server in a hierarchy of contact points.

95. The method of claim 83 further comprising:
providing a plurality of satellite servers, each satellite server configured to receive one or more contact points from senders and configured to periodically generate and receive updates from one or more satellite servers.

96. A computer implemented method comprising:
receiving, at a satellite server, one or more contact points of a do-not-contact list from a master server coupled with the satellite server, each of the contact points being encrypted with an encryption scheme and each being associated with one or more categories, wherein each encrypted contact point is further associated with a value for each of those associated categories which indicates whether communication is desired for that category, wherein one or more registrants register with the master server to provide one or more contact points, wherein the one or more contact points of the do-not-contact list includes at least one of categories that particular registrant contact points do not want to receive and categories that particular registrant contact points want to receive, and wherein the satellite server is one of a plurality of satellite servers coupled with the master server;
generating a do-not-contact list for the satellite server from the received encrypted contact points;
receiving, at the satellite server, a list of one or more contact points from a sender each being encrypted with the same encryption scheme as was used to encrypt the one or more contact points received from the master server, wherein one or more unencrypted contact points corresponding to the one or more encrypted contact points received from the sender are not revealed to the satellite server;
comparing the list of one or more encrypted contact points received from the sender to the satellite server's do-not-contact list; and
reporting to the sender any encrypted contact point on the list of one or more encrypted contact points received from the sender that appears on the satellite server's do-not-contact list, and for each of those matching encrypted contact points, reporting to the sender at least a category of message that may be sent to a contact point that corresponds with that encrypted contact point.

97. The method as in claim 96 further comprising:
reporting to the sender, for each of those matching encrypted contact points, at least a category of message that may not be sent to a contact point that corresponds with that encrypted contact point.

98. The method as in claim 96 wherein the one or more registrants access the master server in order to register the one or more registrant contact points.

99. The method as in claim 96 further comprising:
providing a website for the one or more registrants to register the one or more registrant contact points with the master server.

100. The method as in claim 99 wherein the one or more registrants register the one or more registrant contact points with the master server directly.

101. The method as in claim 96 further comprising:
providing an intermediary registration server which passes the one or more registrant contact points to the master server.

102. The method as in claim 96 wherein the one or more contact points received from the master server includes only changes to those contact points that have not been transmitted to the satellite server.

103. The method as in claim 96 further comprising:
updating the satellite server's do-not-contact list responsive to receiving additional contact points of the do-not-contact list from the master server.

104. The method as in claim 96 wherein any of the contact point includes any one of electronic contact point whose address can be represented in an alphanumeric form, electronic mail address, instant messenger identifier, telephone number, facsimile number, mobile phone number, domain name, subdomain name, and pager number.

105. The method as in claim 96 further comprising:
obtaining a set of one or more categories of messages to be sent by the sender; and
for each matching encrypted contact point and each of the set of sender's categories of messages to be sent, reporting to the sender whether a contact point corresponding to that encrypted contact point wants to receive messages of that category.

106. The method as in claim 96 wherein the master server is one of implemented on a single device, implemented in a distributed scheme, implemented on a multiple devices in one or more networks, and implemented using a multi-tier architecture.

107. A computer implemented method comprising:
receiving, at a satellite server, one or more contact points of a do-not-contact list from a master server coupled with the satellite server, each of the contact points being encrypted with an encryption scheme and each being associated with one or more categories, wherein each encrypted contact point is further associated with a value for each of those associated categories which indicates whether communication is desired for that category, wherein one or more registrants register with the master server to provide one or more contact points, and wherein the satellite server is one of a plurality of satellite servers coupled with the master server;
generating a do-not-contact list for the satellite server from the received encrypted contact points;
receiving, at the satellite server, a list of one or more contact points from a sender each being encrypted with the same encryption scheme as was used to encrypt the one or more contact points received from the master server, wherein one or more unencrypted contact points corresponding to the one or more encrypted contact points received from the sender are not revealed to the satellite server;
receiving a set of one or more categories of messages to be sent by the sender;
comparing the list of one or more encrypted contact points received from the sender to the satellite server's do-not-contact list; and
reporting to the sender any encrypted contact point on the list of one or more encrypted contact points received from the sender that appears on the satellite server's do-not-contact list and for each matching encrypted contact point and each of the set of sender's categories of messages to be sent, reporting to the sender whether a contact point that corresponds with that encrypted contact point wants to receive messages of that category.

108. The method as in claim 107 wherein the one or more contact points of the do-not-contact list received from the master server includes at least one of categories that particular registrant contact points do not want to receive and categories that particular registrant contact points want to receive.

109. The method as in claim 108 further comprising:
reporting to the sender, for each of those matching encrypted contact points, at least a category of message that may not be sent to a contact point that corresponds to that encrypted contact point.

110. The method as in claim 108 further comprising:
reporting to the sender, for each of those matching encrypted contact points, at least a category of message that may be sent to a contact point that corresponds with that encrypted contact point.

111. The method as in claim 107 wherein the one or more registrants access the master server in order to register the one or more registrant contact points.

112. The method as in claim 107 further comprising:
providing a website for the one or more registrants to register the one or more registrant contact points with the master server.

113. The method as in claim 112 wherein the one or more registrants register the one or more registrant contact points with the master server directly.

114. The method as in claim 107 further comprising:
providing an intermediary registration server which passes the one or more registrant contact points to the master server.

115. The method as in claim 107 wherein the one or more contact points received from the master server includes only changes to those contact points that have not been transmitted to the satellite server.

116. The method as in claim 107 further comprising:
updating the satellite server's do-not-contact list responsive to receiving additional contact points of the do-not-contact list from the master server.

117. The method as in claim 107 wherein any of the contact point includes any one of electronic contact point whose address can be represented in an alphanumeric form, electronic mail address, instant messenger identifier, telephone number, facsimile number, mobile phone number, domain name, subdomain name, and pager number.

118. The method as in claim 107 wherein the master server is one of implemented on a single device, implemented in a distributed scheme, implemented on a multiple devices in one or more networks, and implemented using a multi-tier architecture.

* * * * *